ELECTRONIC CONVERTOR AND CONTROL MEANS

Original Filed Oct. 25, 1962 12 Sheets-Sheet 1

INVENTORS
CLAYTON H. CLARK
DONALD J. STEFANIK

BY Strauch, Nolan, Neale
Nies & Bronaugh
ATTORNEYS

| ↑ | ↓ | BAUDOT 5 4 3 2 1 | LTR DRUM POSITION | FIG. |
|---|---|---|---|---|
| 3 | E | 00001 | 2 | 34 |
| – | A | 00011 | 4 | 36 |
| BELL | S | 00101 | 6 | 38 |
| 8 | I | 00110 | 7 | 39 |
| 7 | U | 00111 | 8 | 40 |
| $ | D | 01001 | 10 | 42 |
| 4 | R | 01011 | 11 | 43 |
| ' | J | 01011 | 12 | 44 |
| , | N | 01100 | 13 | 45 |
| ! | F | 01101 | 14 | 46 |
| : | C | 01110 | 15 | 47 |
| ( | K | 01111 | 16 | 48 |
| 5 | T | 10000 | 17 | 49 |
| " | Ƶ | 10010 | 18 | 50 |
| ) | L | 10010 | 19 | 51 |
| Z | W | 10011 | 20 | 52 |
| # | H | 10100 | 21 | 53 |
| 6 | Y | 10101 | 22 | 54 |
| ¢ | P | 10110 | 23 | 55 |
| 1 | Q | 10111 | 24 | 56 |

| ↑ | ↓ | BAUDOT 5 4 3 2 1 | LTR DRUM POSITION | FIG. |
|---|---|---|---|---|
| 9 | O | 11000 | 25 | 57 |
| ? | B | 11001 | 26 | 58 |
| & | G | 11010 | 27 | 59 |
| . | M | 11100 | 29 | 61 |
| / | X | 11101 | 30 | 62 |
| ; | V | 11110 | 31 | 63 |
| | FIGS | 11011 | 28 | 60 |
| | LTRS | 11111 | 32 | 64 |
| | SPACE | 00100 | 5 | 37 |
| | CAR. RET | 01000 | 9 | 41 |
| | LINE FEED | 00010 | 3 | 35 |
| | BLANK | 00000 | 1 | 33 |

INVENTORS
CLAYTON H. CLARK
DONALD J. STEFANIK
BY Strauch, Nolan, Neale, Nies & Brouaugh
ATTORNEYS INVENTORS
CLAYTON H. CLARK
BY DONALD J. STEFANIK
Strauch, Nolan, Neale, Nies & Bronaugh
ATTORNEYS

ELECTRONIC CONVERTOR AND CONTROL MEANS

Original Filed Oct. 25, 1962 12 Sheets-Sheet 4

INVENTORS.
CLAYTON H. CLARK
DONALD J. STEFANIK
BY Strauch, Nolan, Neale, Nies & Bronaugh
ATTORNEYS ELECTRONIC CONVERTOR AND CONTROL MEANS
Original Filed Oct. 25, 1962 
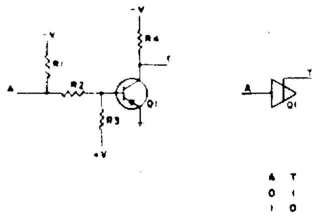
Fig. 5 INVERTER
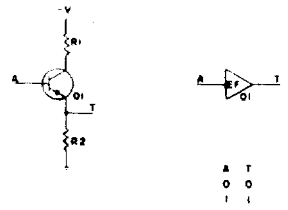
Fig. 6 EMITTER — FOLLOWER
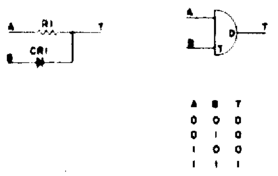
Fig. 7 SINGLE DIODE GATE
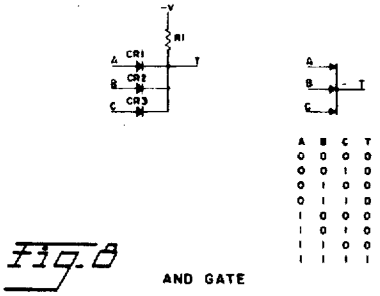
Fig. 8 AND GATE
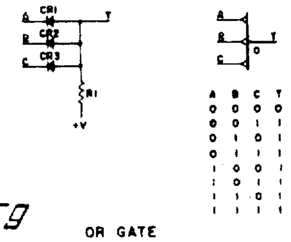
Fig. 9 OR GATE
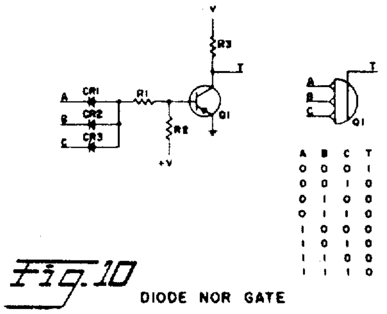
Fig. 10 DIODE NOR GATE
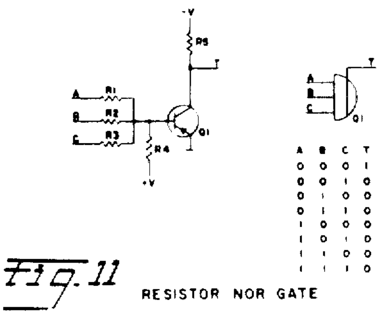
Fig. 11 RESISTOR NOR GATE
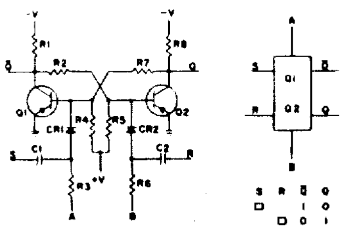
Fig. 12 REGISTER
INVENTORS
CLAYTON H. CLARK
DONALD J. STEFANIK
BY Strauch, Nolan, Neale, Nies & Brouaugh
ATTORNEYS

ELECTRONIC CONVERTOR AND CONTROL MEANS

Original Filed Oct. 25, 1962 12 Sheets-Sheet 6

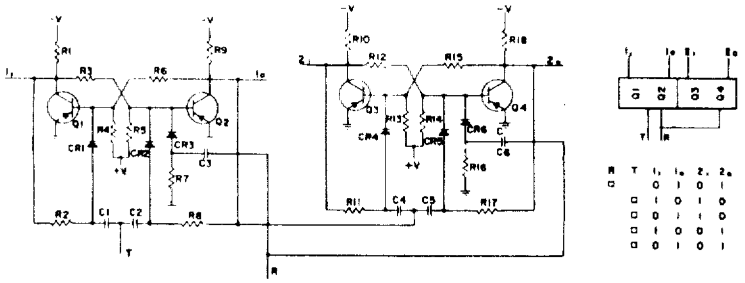

Fig. 13

COUNTER

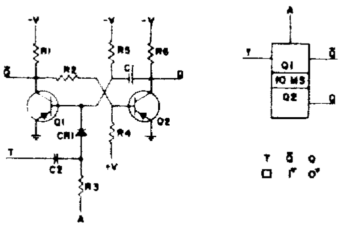

Fig. 14

ONE-SHOT

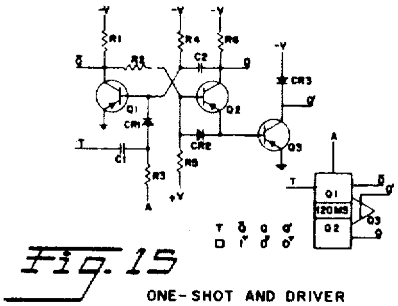

Fig. 15

ONE-SHOT AND DRIVER

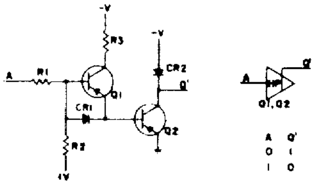

Fig. 16

EMITTER FOLLOWER AND DRIVER

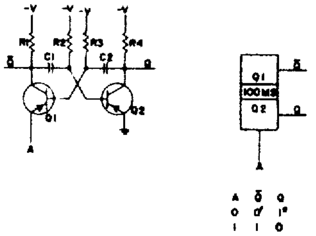

Fig. 17

FREE-RUNNING MULTIVIBRATOR

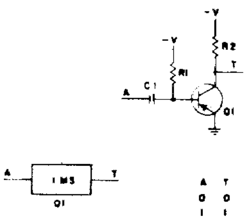

Fig. 18

TIME DELAY

NOTES:

1. 1 = NEGATIVE VOLTAGE LEVEL
   0 = 0 VOLTAGE LEVEL

2. △ = NO OUTPUT
   □ = PULSE PRODUCED BY A TRANSITION FROM 1 TO 0.
   ▽ = OUTPUT LEVEL IS OF ADJUSTABLE LENGTH.

INVENTORS
CLAYTON H CLARK
DONALD J. STEFANIK
BY Strauch, Nolan, Neale, Nies & Bronaugh
ATTORNEYS

ELECTRONIC CONVERTOR AND CONTROL MEANS

Original Filed Oct. 25, 1962 12 Sheets-Sheet 7

INVENTORS
CLAYTON H. CLARK
DONALD J. STEFANIK
BY Strauch, Nolan, Neale, Nies & Brouaugh
ATTORNEYS INVENTORS
CLAYTON H. CLARK
DONALD J. STEFANIK
BY Strauch, Nolan, Neale, Nies & Bronaugh
ATTORNEYS Jan. 9, 1968 C. H. CLARK ET AL 3,363,238

ELECTRONIC CONVERTOR AND CONTROL MEANS

Original Filed Oct. 25, 1962 12 Sheets-Sheet 9

INVENTORS
CLAYTON H. CLARK
DONALD J. STEFANIK
BY Strauch, Nolan, Neale, Nies & Bronaugh
ATTORNEYS INVENTORS
CLAYTON H. CLARK
DONALD J. STEFANIK
BY Strauch, Nolan, Neale, Nies & Bronaugh
ATTORNEYS Jan. 9, 1968 C. H. CLARK ET AL 3,363,238

ELECTRONIC CONVERTOR AND CONTROL MEANS

Original Filed Oct. 25, 1962 12 Sheets-Sheet 11

INVENTORS
CLAYTON H. CLARK
DONALD J. STEFANIK
BY Strauch, Nolan, Neale Nies & Bronaugh
ATTORNEYS

SPECIAL OR GATE (SOR) WITH A REGISTER

INVENTORS
CLAYTON H. CLARK
DONALD J. STEFANIK
BY Strauch, Nolan, Neale, Nies & Bronaugh
ATTORNEYS United States Patent Office
3,363,238
Patented Jan. 9, 1968

3,363,238
ELECTRONIC CONVERTOR AND CONTROL MEANS

Clayton H. Clark, Mundelein, and Donald J. Stefanik, Berwyn, Ill., assignors to SCM Corporation, New York, N.Y., a corporation of New York Original application Oct. 25, 1962, Ser. No. 233,109, now Patent No. 3,291,909. Divided and this application May 2, 1966, Ser. No. 546,632
23 Claims. (Cl. 340—172.5)

ABSTRACT OF THE DISCLOSURE

An electronic transistorized drum printer receiver including automatic print hammer carriage spacing mechanism and carriage return mechanism and electronic control circuitry which can receive multiple serial information bits on an incoming line. The electronics includes circuitry to convert received serial code signal units to and register them in parallel bit form; it includes circuitry which determines whether such parallel registered code unit bits call for printing of a character or for a machine function and further determines, if a machine function is called for, what that machine function is; it includes second and third registers to receive multiple bit parallel information from the first register to make room for receiving the next following characters on the incoming line while the first character is being printed or while the represented function is being performed, the third register having automatic circuitry to shift the multiple code unit bits from the second register into the third register and provide back-up storage for two additional characters during an automatic carriage return operation. The control circuitry includes subsidiary comparative coincidence control circuitry responsive to both of the code unit bits in the third register and to position pulses derived from print drum rotation to determine when the character corresponding to the received and parallel registered code signal is about to pass the print hammer, and thereafter properly operate printing action, clear the third register, enable and initiate subsequent operation of carriage spacing after the character is printed and enable and initiate both automatic operation of carriage return and complete disabling of carriage spacing mechanism during that carriage return. A modification of the subsidiary control circuitry is used with a duel hammer drum printer and has comparative coincidence determination of two sequentially received and registered groups of sode signal bits with print out of the first and then of the second of the two type characters, representative of the two registered groups of code signal bits, which rotate into print position opposite the print hammers, regardless of which of the two representative type characters is the first to appear at the print station and also enables simultaneous print out of both characters if the two registered groups of code signal bits are identical.

Other related patents, the applications for which were co-pending with the present application, are U.S. Patents Nos. 3,280,256, 3,304,366 and 3,327,626. A companion divisional application is Ser. No. 546,808, filed May 2, 1966 for comparator circuit.

*Background of the invention*

This invention relates to the electronic convertor and control means in a receiving page printer utilizing a continuously rotating print carrier and a traveling print hammer carriage, primarily intended for either fixed station or vehicular installation as sending monitors or printing receivers in telegraphic communication systems. This application is a division of co-pending application Ser. No. 233,109, filed Oct. 25, 1962, now Patent No. 3,291,909.

Briefly, in the drum type of page printer to which the present invention is applicable, the rotating drum is composed of a plurality of rings of type, the type symbols in each ring being arranged in identical sequence and aligned with matching type symbols. A print hammer, which is mounted upon a print hammer carriage assembly, is moved from left to right in front of the drum and is actuated to press an ink ribbon against the paper record and the drum at an appropriate rotational position of the drum to print a desired character at that carriage position. A pulse clock assembly on the rotation drum supplies a series of pulses, as the drum rotates, to the printer electronics in accord with the angular positions of the characters on the drum. These pulses are processed in the printer electronics and compared to the incoming or monitored keyboard signals to thereafter cause energization of the print hammer solenoid as the desired character moves in front of the hammer. Characters on each ring of type are identical and are placed in binary order according to the desired code. Each character is assigned a position in binary progression of a counter, e.g., a 64 count counter, so that the printer electronics can compare an incoming character code signal combination against the series of pulses that indicate the physical position of the drum characters. The electronics in the present invention uses continuous counting and comparison.

The electronics of a Baudot coded drum printer accomplishes operational functions as follows:

(1) Register in parallel form the five serial information bits of an incoming Baudot character.

(2) Determine whether the five bits represent either a printing or a machine function character.

(3) Determine what the machine function is.

(4) Shift the five bits of the code signal combination into a second set of registers and make room for the following character while the first character is being printed or while the represented machine function is being preformed.

(5) Shift the five bits into a third set of registers to make room for two characters during the carriage return periods.

(6) If ribbon lift is utilized, control the ribbon lifting operations so that ribbon will be raised and in print position before the print solenoid is energized.

(7) Under control of character position pulses from the printing mechanism, determine when the registered character is about to pass the print hammer.

(8) Control energizing of the print solenoid.

(9) Control operation of the spacing mechanism after the character is printed.

(10) Control operation of the carriage return and line feed mechanisms.

The foregoing functions are accomplished in the printers of this invention as well as that in copending application Ser. No. 184,820.

Primarily, the improvements of this present invention involve the correlated mechanisms and electronic controls for spacing and returning the print hammer carriage.

The present invention utilizes a comparison system between an incoming code and a code derived from drum printer rotation rather than destructive read-out. Either type of comparative circuit can be utilized in the drum printer. However in the comparison system utilized in the present invention, applicants' have devised a new comparator circuitry and network to provide comparison and furnish a coincidence information signal. The print hammer carriage of the present invention is universal in that it may be used as a single print hammer carriage or a dual print hammer carriage. A further improvement resides in the elimination of mechanical operated control switches at the various limits of travel of the print hammer carriage and, instead, the print hammer carriage uses a high strength miniature permanent magnet secured in the print hammer carriage to magnetically operate glass encapsulated reed switches to control the printer electronics for various automatic functions.

*Summary of the invention*

Accordingly, a primary object of this invention resides in the provision of an improved high speed drum printer including a hammer carriage with printing components shiftable by a space solenoid operation in spacing steps from left to right in front of the rotary type carrier, the carriage being shiftable back to a start-of-line position by a positive drive, carriage return mechanism operated by an electro-magnetic clutch and including provision of controls which simultaneously energize the magnetic clutch and the space solenoid whenever a carriage return operation is directed.

A still further object resides in the provision in a type wheel page printer of a novel print hammer carriage operating mechanism, the mechanism step spacing the carriage under spring power, and including a positive drive carriage return mechanism operated through a magnetic clutch, and having controls for automatic disabling of the carriage shift pawl upon the start of the carriage return movement and re-engagement of the carriage shift pawl when the carriage reaches a start-of-line position.

Further novel features and other objects of this invention will become apparent from the following detailed description, discussion and the appended claims taken in conjunction with the accompanying drawings showing the subcomponent structures and units constituting the present invention, in which:

Figure 4A:
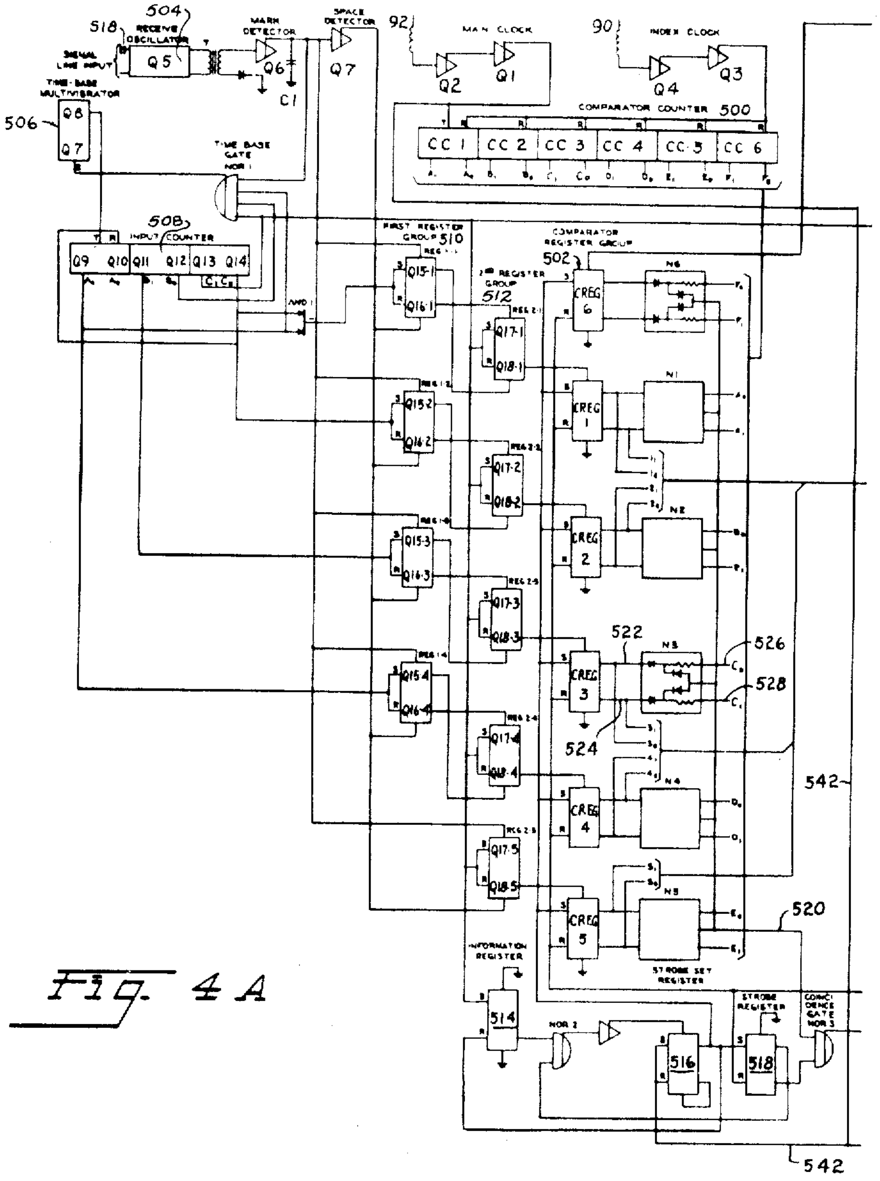
Figure 4B:
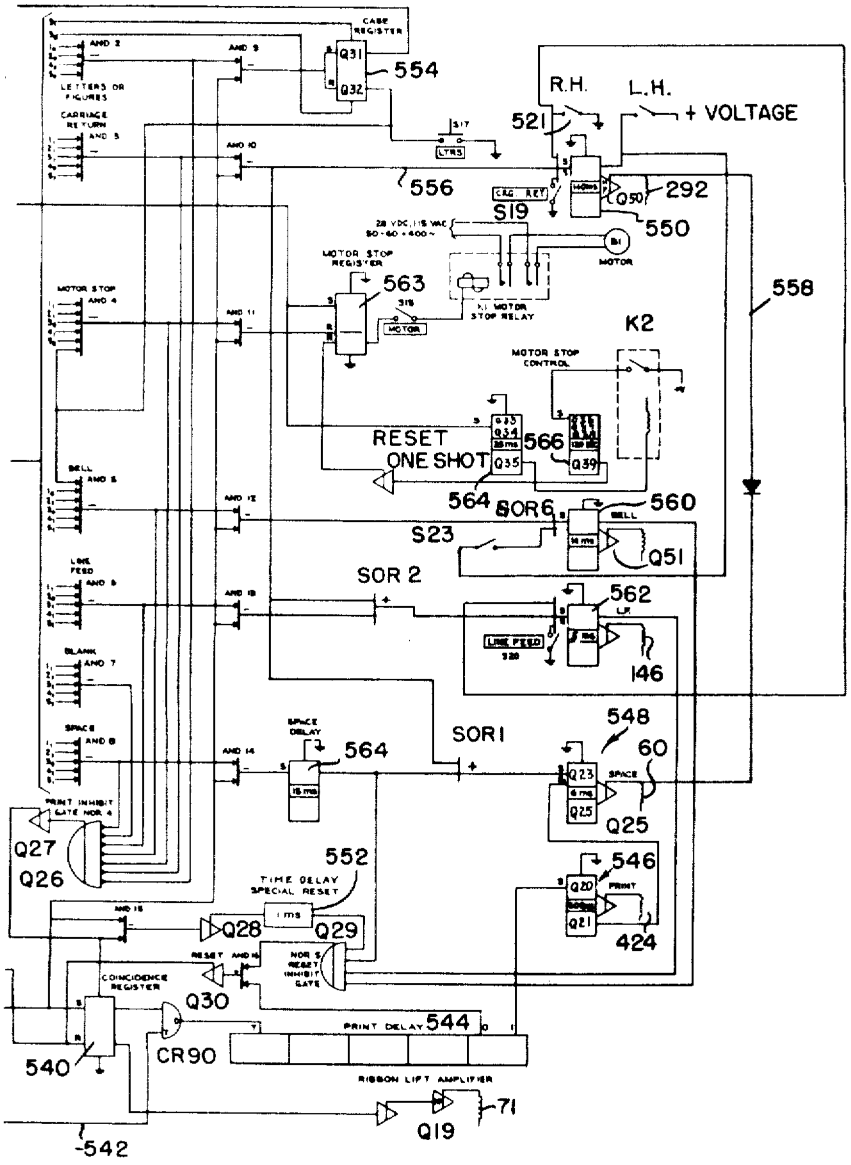
Figure 19:
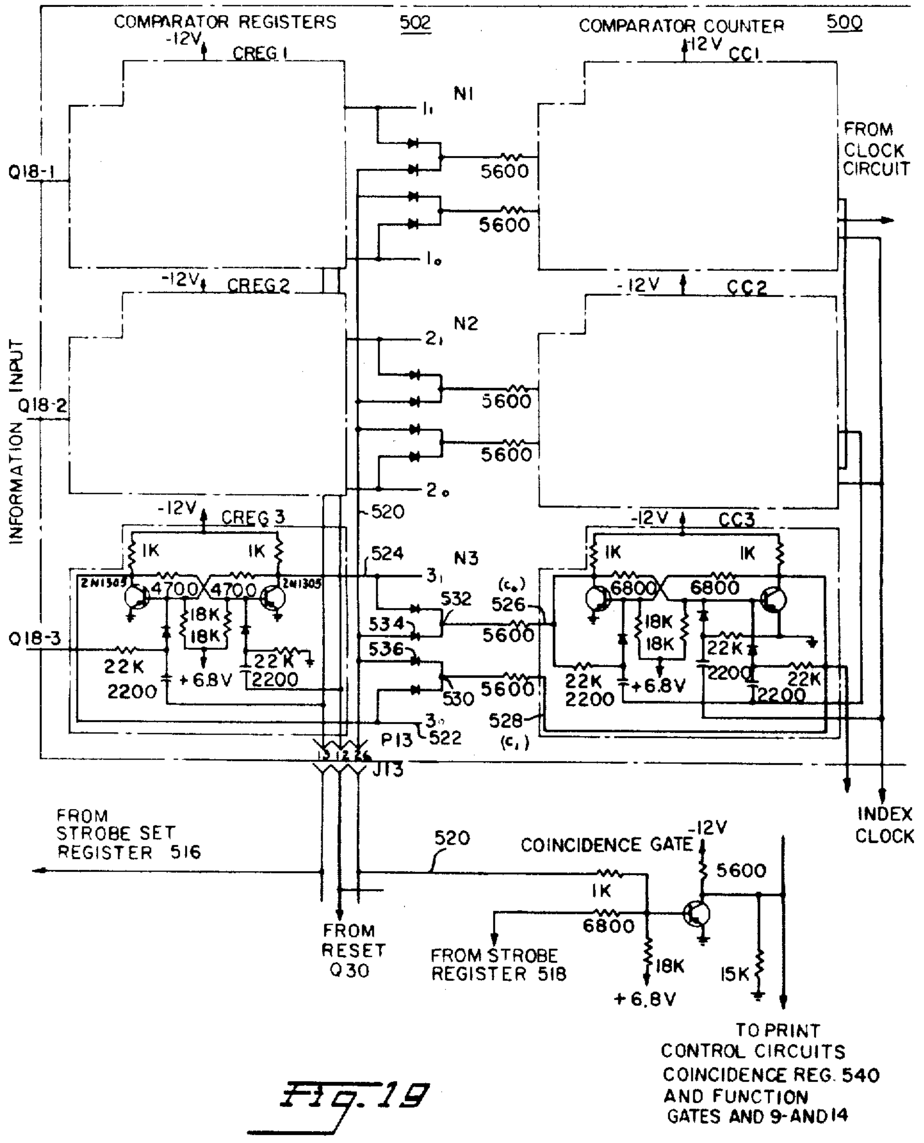
Figures 20, 20A:
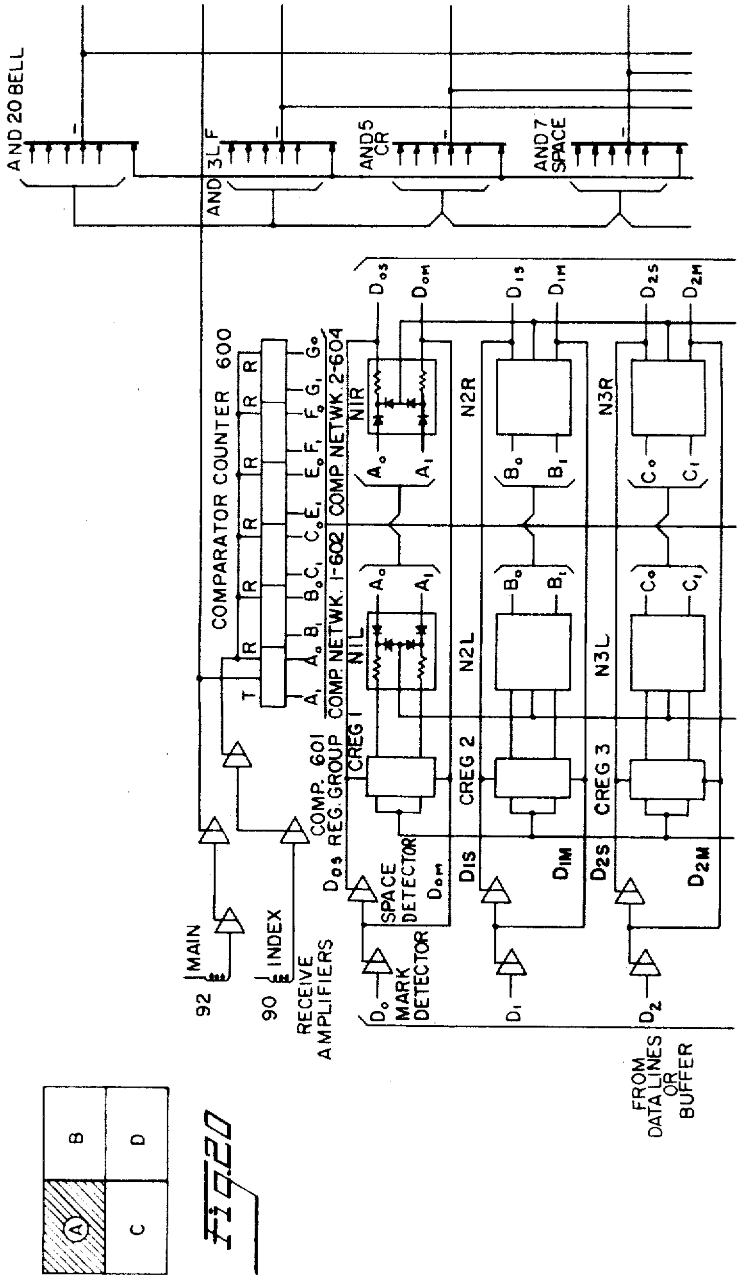
Figure 20B:
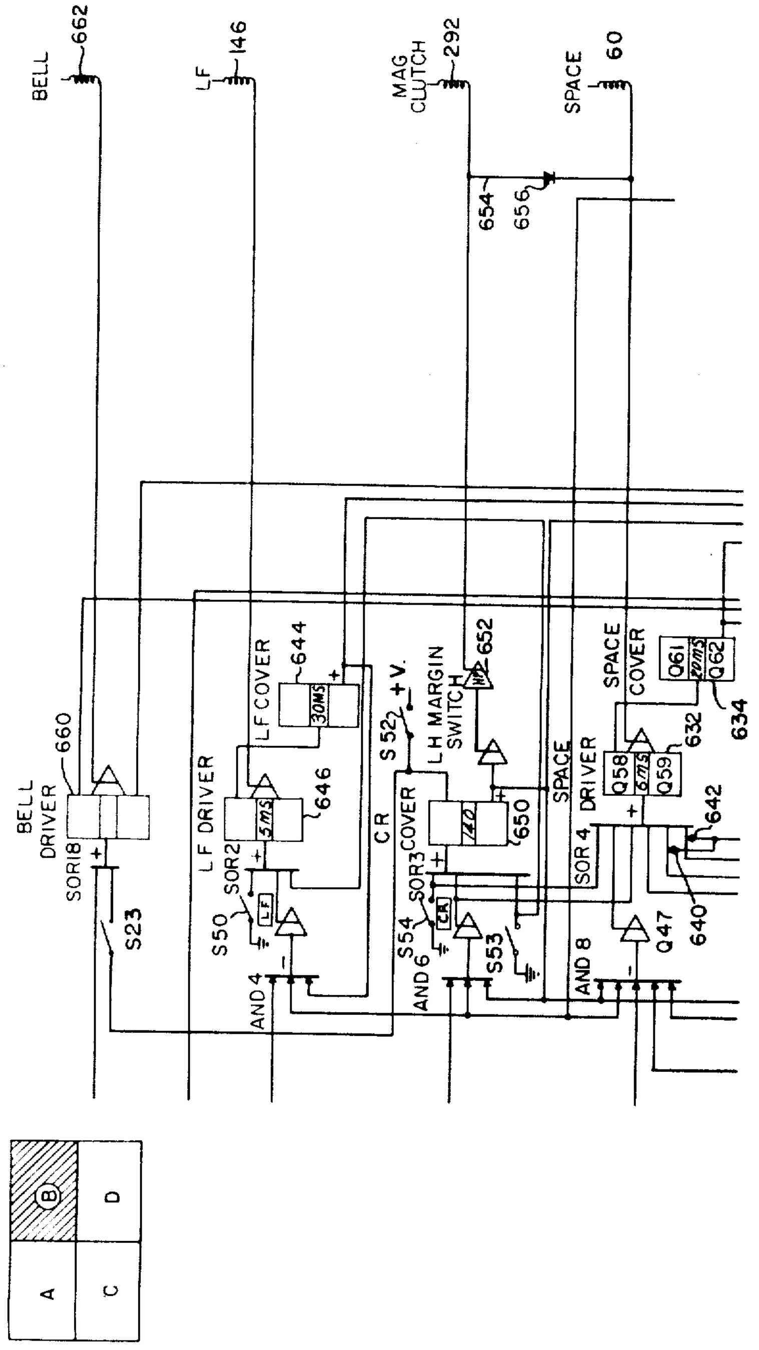
Figure 20C:
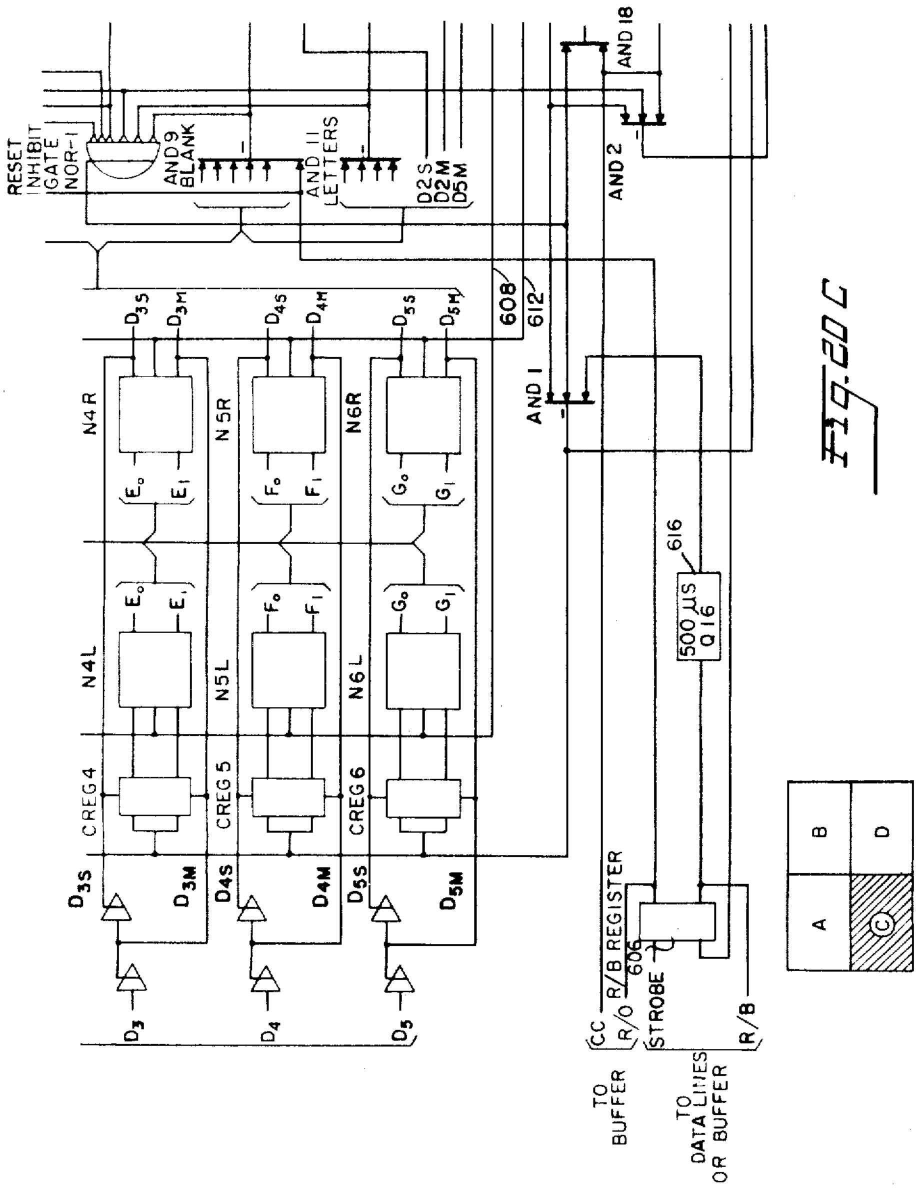
Figure 20D:
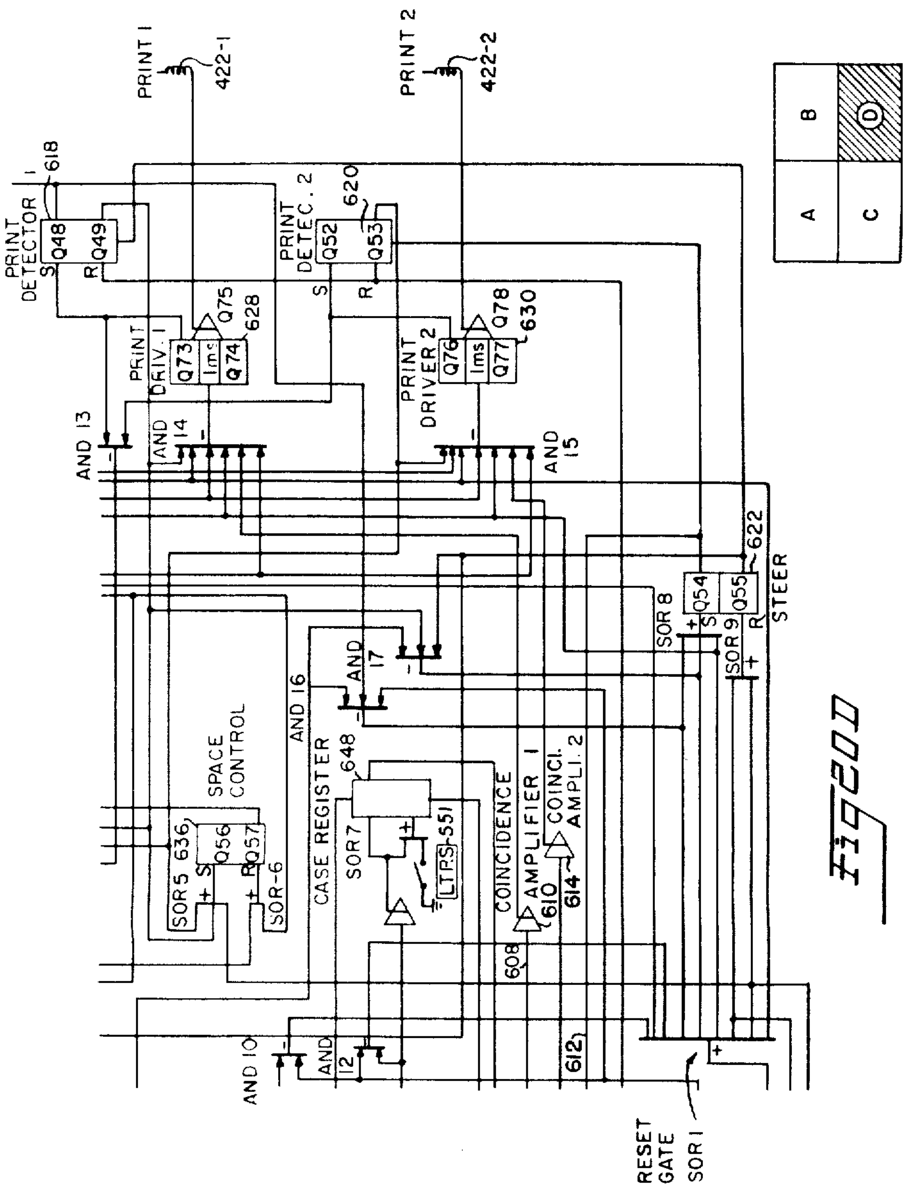
Figure 21:
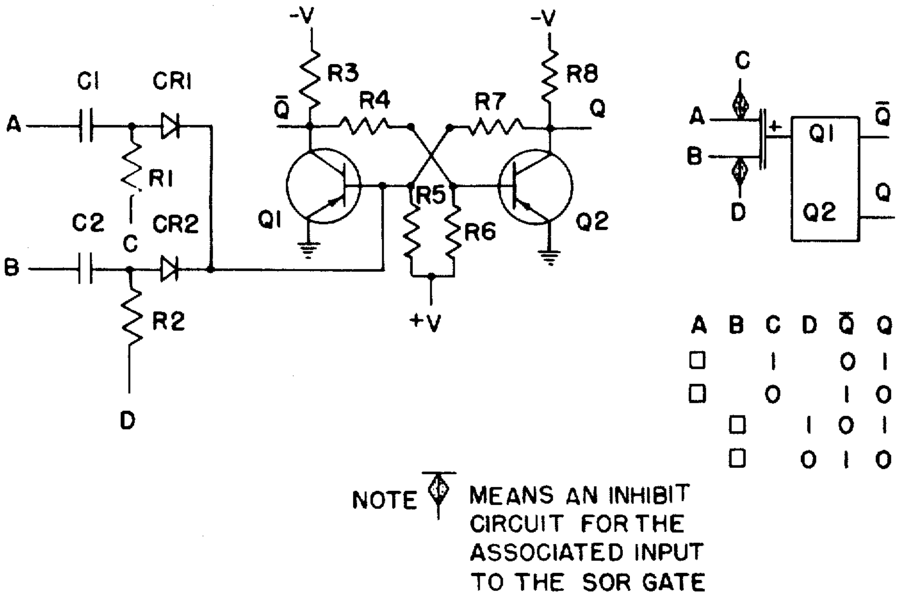

FIGURES 4A and 4B together constitute FIGURE 4 which is a schematic block diagram of the electronics circuitry for a single hammer printer arranged for reception of the Baudot code;

FIGURES 5 to 18, each illustrate a basic schematic circuit corresponding to a specific one of the logic symbols used in FIGURE 4. These circuits in essence constitute a legend enabling basic construction of the transistorized electronics represented by the FIGURE 4 logic diagram;

FIGURE 19 is a detail schematic diagram showing several comparator registers, their associated comparator counter flip-flops and the novel comparator network of this invention connected between correlated registers to enable an information signal responsive to coincidence between correlated registers;

FIGURE 20, separated into four sheets containing FIGURES 20A, 20B, 20C and 20D, is a schematic block diagram of an exemplary electronics circuitry for a dual hammer printer arranged for reception of the Baudot code; and FIGURE 21 is a basic schematic circuit, showing the special OR gates (SOR) which appear in FIGURE 20, together with its logic symbol and logic,

*General*

Figure 1:
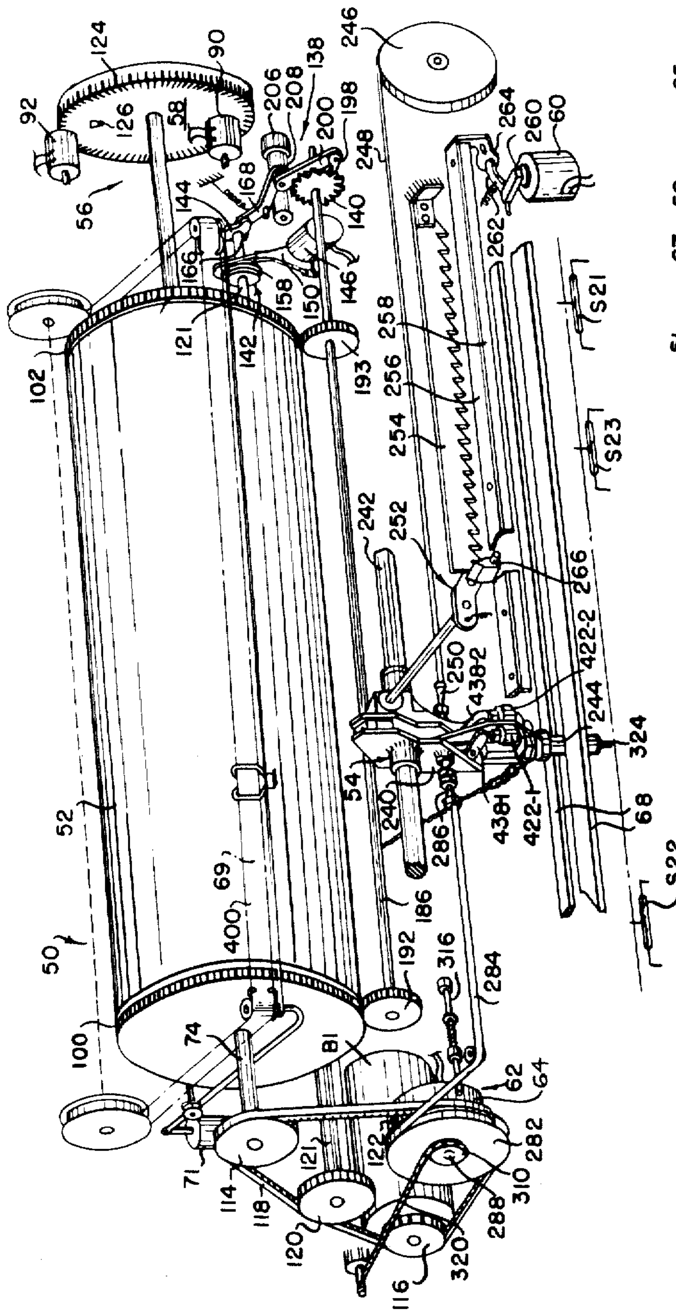
FIGURE 1 is a front perspective skeleton view illustrating the major mechanical components of a drum printer in accord with the present invention. Although this view omits many details utilized in such a drum printer they are not deemed necessary to an understanding of the present invention.

The major mechanical components of a drum printer, including those pertinent to this invention, are shown in the skeleton arrangement of FIGURE 1 and will be generally described. The frame structure of the printer, the ribbon feed and reverse mechanism and various manual control switches are not shown in FIGURE 1, however a representative somewhat similar drum printer assembly can be found in copending application Ser. No. 184,820, now Patent No. 3,280,256, to which reference may be had, if necessary, for a complete understanding of the printer construction.

The printer is designed primarily for use in a send-receive tele-printer set, being used for page copy monitoring and/or page copy receiving.

The single hammer embodiment is capable of operating at nominal average speeds up to and including 200 w.p.m. on a half duplex neutral signaling channel. If dual print hammers are utilized, with double step character spacing, average operational maximum speed is appreciably increased, up to at least 400 w.p.m. Further multiplication of the number of print hammers with a correlated increase in character spaces per stepping action will result in the attaining of higher operational speeds.

By various suitable arrangements of the printer electronics and by using different fonts of type faces on the print drum the printer can accommodate codes other than the five-unit Baudot code, for example, the seven-unit alfa-numerical field data code could be utilized if desired. However, only exemplary Baudot code electronics for single and dual print hammer printers are disclosed herein.

In general, the printer mechanics 50 employs a motor driven rotating type drum 52 which, for standard communications printers, will have 72 rings of type, each type ring having the 52 standard communications symbols.

Characters on each ring of type are similarly placed in binary order according to the Baudot code for the character, each character being assigned a position in a 64 count binary progression so that the printer electronics can compare an incoming character code against a code combination representative of the series of pulses subsequent to an index position which indicates the physical position of the drum characters relative to that indexing position. When comparison matches, coincidence, the electronics logic can determine exactly when to actuate the print hammer for printing the character when the drum rotates that character in front of the print hammer.

The complete drum 52 includes on its cylindrical periphery a plurality of different horizontal lines of identical information symbols, for a conventional telegraph printer, seventy-two (72) identical symbols, e.g., seventy-two A's, constituting one line of identical character type faces extending along the cylindrical drum periphery parallel to the drum axis. The drum 52 and an attached drum position clock wheel 58 are continuously rotated by a printer motor B1 when the motor is running. Related printer electronics will be described hereinafter with reference to the printer logic diagram FIGURE 4.

As depicted in FIGURE 1, a print hammer carriage assembly 54 is mounted for stepped spacing movement in a horizontal path from left to right and return movement from right to left in front of the type drum 52. The illustrated hammer carriage assembly 54 is universal in nature and can accommodate one or two print hammers with associated operating components.

Depending upon the style of drum and the arrangement of printer electronics utilized, a print hammer mechanism could be energized to strike the drum one or more times during a 360° rotation of the print drum. In the exemplary single hammer disclosure however, a print action can occur within a range from 180° rotation to 540° rotation, because of a built-in delay permitting 180° rotation of the drum after coincidence is determined to assure sufficient time for lifting the ink ribbon to print position before the directed printing action. Also, in the single print hammer embodiment, a drum rotation of 360° is required to obtain the next coincidence for a repeated character, which is followed by the 180° delay. In the dual hammer embodiment print action can occur within a range from 0° to 360° rotation, if the ribbon lift action is omitted.

The printing mechanism includes an induction pulse clock assembly 56 which supplies one index pulse and a series of character position pulses to the printer electronics, representative of drum rotational position. As will be described hereinafter, the index pulse is used only to initially synchronize the electronics when the printer drum is started to rotate. Since each character position pulse represents a different character reaching a definite drum rotational position, the pulse constitute information which allows the printer electronics to energize the print hammer solenoid as the desired character moves in front of the hammer, or to actuate different machine functions if the received code signal combination are function signals.

The print hammer carriage 54 is stepped across in front of the drum 52 and parallel to the drum axis by spacing mechanism actuated by a spacing solenoid 60 mounted at the right hand side of the printer. Carriage 54 is power driven to a start-of-line position at the left-hand margin by a carriage return mechanism 62, seen at the left hand side of FIGURE 1. Carriage return mechanism is activated by the carriage return magnetic clutch 64, power for carriage return being derived, through clutch 64, from printer motor B1.

Figure 2:
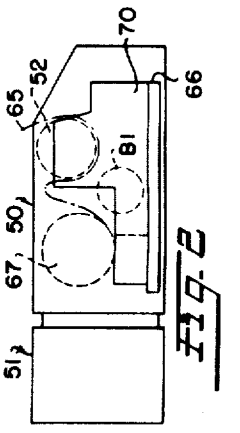
FIGURE 2 is a reduced scale, side view of the complete printer with a module containing the printer electronics at the rear.

Shown diagrammatically in FIGURE 2, a sheet paper strip record medium 65 is supplied from a paper roll 67 mounted behind the drum 52, the paper strip feeding over suitable guide devices (not shown), under and up past the front of the drum 52, passing between the drum 52 and the print hammer carriage 54 and under two side edge top guide fingers (not shown). The paper strip 65 then passes on out of the top of the printer unit 50.

Seen in skeleton form in FIGURE 1, an ink ribbon 69 passes across the drum face parallel to the drum between the print hammer and the paper to transfer the typed impression from the drum to the page during a print operation. The ink ribbon assembly feed and reverse mechanism is conventional and details are not shown. However, the ink ribbon 69 in this printer passes in a straight stretch across the front of the drum 52 parallel to the character spacing path of the print hammer, and the entire straight stretch of the ink ribbon if desired can be lowered and lifted by action of a ribbon lift solenoid 71 to a position in front of the hammer just prior to each printing action. This operation enables viewing of the line being printed without its being obscured by a permanently placed stretch of ink ribbon.

The printer components are mounted on a support structure which includes a thick base plate 66 (FIGURE 2) incorporating a slotted center track 68 (FIGURE 1) which passes laterally from one side of the printer to the other and under the path of travel of the print hammer carriage 54. Two vertical side plates are rigidly secured to the base plate 66 and provide mounting structure for most of the printer components. Support structure details are not shown in FIGURE 1.

The printer electronics is preferably transistorized and mounted either in a module 51 (FIGURE 2) on the back of the printer mechanics or incorporated in large printed circuit boards secured on the underside of the printer frame structure.

The electric drive motor B1 supplies rotational driving power to the printer mechanism 50 by means of a drive belt 118 which connects the motor to the drum shaft, a function power shaft and a carriage return clutch. Drive belt 118 passes around a drive pulley 116 attached to the motor shaft and to three pulleys 118, 120 and 122, which will be later referred to in more detail. To prevent slippage, the drive belt is notched and engages corresponding gear teeth in each pulley.

*Carriage return.*—The carriage return mechanism returns the carriage 54 to the left-hand margin, or start-of-line position, under positive motor drive. In the exemplary embodiment, the return mechanism has been substantially simplified over the complex kinematics of the aforenoted copending application Ser. No. 184,820 now Patent No. 3,280,256.

The major mechanical aspect of the carriage return mechanism are disclosed in FIGURE 1. The mechanism to accomplish carriage return may be actuated in several ways: (1) by receipt of a coded carriage return character; (2) by actuation of an automatic carriage return switch S21; or (3) by actuation of a manual switch S19 (FIGURE 26). Switch S21 is operated after the carriage 54 has spaced to the right-hand margin for printing of the 72nd or last character, at which position the carriage mounted, depending eccentric guide roller 244 is adjacent the end of its track 68. Switch operation by carriage 54 will be described later in this portion of the specification.

Upon receipt of a coded carriage return character signal by the printer electronics, or upon operation of either the automatic carriage return switch S21, and after the 72nd or last character is printed, or upon actuating of manual carriage return switch S19, the printer electronics section, among other actions, energizes the coil in the magnetic carriage return clutch mechanism 62 which is mounted on the left-hand printer frameplate 70.

As the magnetic carriage return clutch is energized, the carriage return belt drum 282 is engaged by the driven clutch pulley 122 to place a power driven winding force on carriage return belt 284 causing powered return movement of carriage 54 to the left, toward the start-of-line position.

During carriage return movement, the space pawl could be permitted to ratchet backwards over the inclined rear faces of the rack teeth, but it is not desirable from a viewpoint of resultant rapid wear of both the pawl and teeth as well as a noise factor. Accordingly, simultaneously with energization of the magnetic clutch return mechanism 62, the printer electronics causes the space solenoid 60 to be energized and held energized until the carriage 54 reaches the left-hand start-of-line position.

Upon approaching several spaces from the left hand margin or start-of-line position, carriage 54 strikes a spring loaded nylon rod 316 moving the rod 316 into a notch in the inner side sheave 320 of the return belt drum 282. As soon as this condition occurs, the print hammer carriage has reached the start-of-line position and will actuate a start-of-line switch S–22 which signals the printer electronics to abruptly and simultaneously deenergize both the clutch coil 292 and the spacing solenoid 60. The space bail permits the space pawl unit 252 to immediately shift to engage the first tooth on rack 254 which positions the carriage 54 for the first printing or function operation.

Shown somewhat diagrammatically in FIGURE 1 are three magnetically actuated, glass encapsulated, reed switches S21, S22 and S23 which are adjustably mounted directly under and aligned in a direction parallel with the path of movement of the print hammer carriage. A miniature high strength permanent magnet 324, bonded in the roller retainer on the bottom of the carriage body 240 moves with the carriage in a path located *immediately* adjacent but clearing the upper side of the three reed switches S21, S22 and S23. The reeds in each switch are steel with gold plated contacts, normally spaced a minute distance apart. When the magnet 324 passes above a switch the flux path at the end of the magnet passes into the steel reels and they close, completing an associated circuit to the printer electronics to accomplish functions, as will be hereinafter further described.

Such reed switches are commercially available and are mounted in flat phenolic mounting blocks.

Switch S23, seen in FIGURE 1, if it is desired is located several character spaces, e.g., five to ten, ahead of the end-of-line position and can be used to ring the conventional printer signal bell (not shown) to warn a local operator that the monitor printer is approaching the end-of-line position.

*Carriage and print hammer.*—Although character selection is accomplished electronically, the actual printing of the character is done mechanically by the print hammer mechanism. When a character is selected, coincidence determined and printing is in order, a print coil of a small electro-magnet is energized, pulling the associated armature toward the core. As the armature is pulled toward the core, a print hammer lever connected to the armature, imparts momentum to the print hammer which moves to impact with the ribbon, paper and print drum to print the desired character. The print hammer return spring restores the print hammer and the armature to the reset position after the print coil has been deenergized.

SINGLE HAMMER ELECTRONICS

*Clock pulses*

The electronic logic circuits for a single print hammer printer arranged for receiving five unit Baudot code is illustrated in FIGURE 4, basic circuits for the various logic symbols being shown in FIGURES 5–18 and 21. As the clock wheel 58 rotates in front of the two clock coils (reading heads) 90 and 92, the clock wheel notches vary the reluctance of the bar type magnets located in the coils, inducing current pulses into the clock transistor amplifiers Q2 and Q4.

Figure 3:
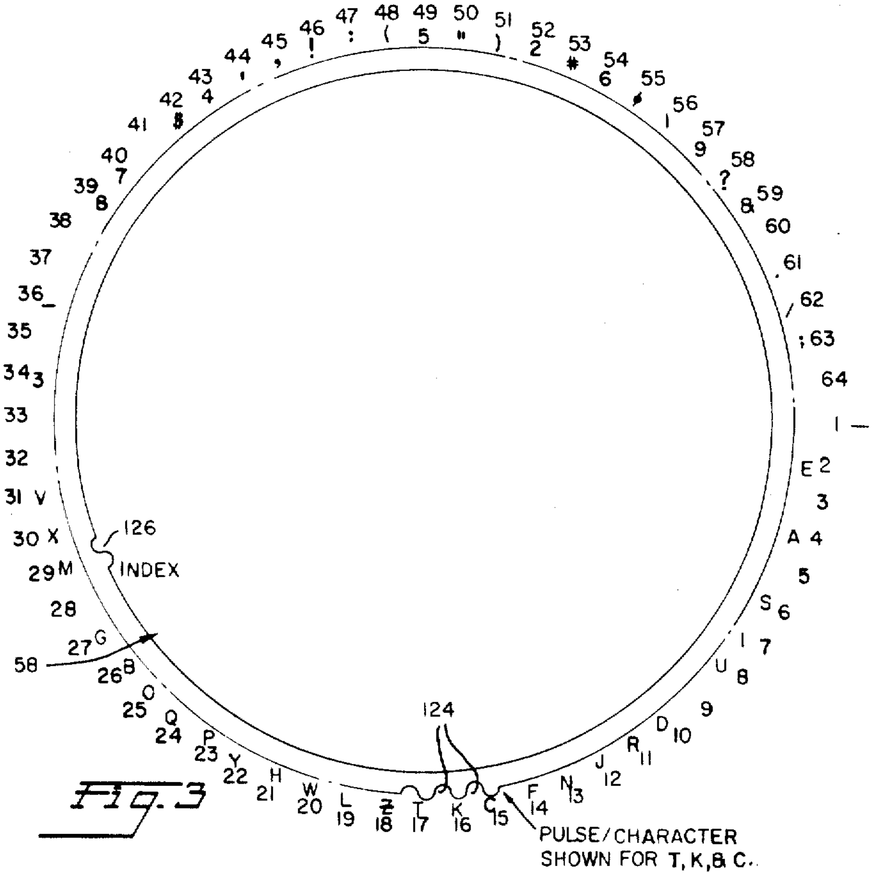
FIGURE 3 is a chart showing relative drum positions for each of the characters and the Baudot code assigned to each character.

Sixty-four notches around the edge of the clock wheel 58 (see FIGURE 3) are monitored by the main clock coil 92. Therefore, each of the 64 clock pulses represents a new character in the printing position, or in a predetermined position relative to the printing position and, through the medium of the electronics, result in energizing the print hammer solenoid 424 the instant the desired character moves in front of the hammer.

A single hole 126, towards the center of the clock wheel 58, is monitored by the index clock coil 90. The resulting one index pulse per drum revolution is used to reset a comparator counter 500. The index pulse is effective in initial synchronization of the type drum with the comparator counter when power is first supplied to the motor B1. Subsequent index pulses, although present, are ineffective, since the counter 500 resets itself upon reaching a count of 64 during each drum revolution.

*Comparator counter.*—The 6-stage comparator counter 500 is stepped continually by main clock pulses. Two output leads from each of the six counter flip-flop stages connect to a corresponding individual comparator network, designated by reference characters N1 through N6, for comparison with the incoming character which will appear in the comparator register group 502.

*Input detector and input counter*

*Line termination.*—The two-wire signal line from either a local or remote transmitter terminates on a receive oscillator 502 that is extremely sensitive to changes between mark and space. The astable (that is, free running) receive oscillator 504 runs only during a mark condition on the line. Oscillations of approximately 50 kc. exist during all mark conditions, no oscillations during space conditions. A transition between mark and space starts or stops the oscillator 504 within the time of two cycles of the 50 kc. rate. Transformer T1 provides DC isolation between the signal line and the printer electronics.

*Mark and space detectors.*—Mark detector transistor Q6 is kept on for a mark condition by the negative output swings of the receive oscillator. Capacitor C1 keeps the mark transistor Q6 on during the positive swings of the oscillator; this is necessary because the 50 kc. rate of the receive oscillator is within the switching frequency of mark transistor Q6. For a space condition the oscillator 504 turns off, allowing mark transistor Q6 to turn off. Time base gate NOR 1 provides an output ground level with Q6 off, allowing the time-base multivibrator 506 to step the input counter 508. Space detector transistor Q7 is turned on by the turning off of mark transistor Q6. The other function of the mark and space detectors Q6 and Q7 is to set or reset all of the associated flip-flops REG 1—1 through REG 1—4 of the first register group 510 and the fifth flip-flop REG 2—5 of the second register group 512.

*Time base gate NOR 1 and time-base multivibrator.*—The astable time-base multivibrator 506 can be operated for line speeds of 60, 100, and 200 u.p.m. The frequency of the multivibrator is set for the various speeds by changing the resistance of the base circuits (see FIGURE 12) with a 3-position time base switch (not shown). Time base gate NOR 1 inhibits the time base multivibrator 506 until a start pulse is received from the signal line. This start pulse allows the output of time base gate NOR 1 to provide a ground level at the emitter of time base multivibrator transistor Q7 to start the multivibrator. Output pulses from the multivibrator 506 now step the input counter 508. During the stop pulse, time base gate NOR 1 switches to a negative level; therefore, the emitter of time base multivibrator transistor Q7 being at a negative level, stops the multivibrator.

*Input counter.*—The eight-count input counter 508 (1) gates the incoming code bits to the proper flip-flop of the first register group 510, (2) moves the information to the second register group 512 during the fifth code bit, and (3) starts the printer motor B1. The input counter 508 is stepped by the time base multivibrator 506 at the desired 60, 100 or 200 w.p.m. speed. Since only seven counts are necessary to synchronize with the 7-bit Baudot code (five unit code plus the start and stop bits), a skip pulse is generated to allow the eight-count input counter 508 to complete its cycle once in seven counts. The skip pulse is inserted between the receipt of the first and second code bits. This skip pulse is almost instantaneous so as not to disrupt the synchronism between multivibrator 506 and line. The $C_0$ output lead of the input counter 508 is connected back to the $A_0$ side of the counter to produce a skip pulse. The skip pulse steps the A section of the counter into the second code bit condition and leaves the C sections of the counter in the proper condition for the second code bit. The input counter output pattern is as follows:

| $A_1$ | $A_0$ | $B_1$ | $B_0$ | $C_1$ | $C_0$ | |
|---|---|---|---|---|---|---|
| X | 0 | 0 | X | 0 | X | Start. |
| 0 | X | 0 | X | 0 | X | #1 Bit. |
| X | 0 | X | 0 | X | 0 | Skip. |
| 0 | X | X | 0 | X | 0 | #2 Bit. |
| X | 0 | 0 | X | X | 0 | #3 Bit. |
| 0 | X | 0 | X | X | 0 | #4 Bit. |
| X | 0 | X | 0 | 0 | X | #5 Bit. |
| 0 | X | X | 0 | 0 | X | Stop. |

X=Negative Level.
0=Ground Level.

*Registering A character*

*First register group.*—The first register group 510 consists of four flip-flops REG 1—1 through REG 1—4. The first four code bits of an incoming sequential character are used initially to control the condition of these flip-flops. By the time the fifth code bit is received, the character previously stored in the second register group 512 has been shifted into the third or comparator register group 502. Therefore, the fifth code bit can be used to directly control the condition of the fifth flip-flop REG 2—5 of the second register group 510. This is why the first register group need have only four flip-flops. The output of the input counter 508 sequentially triggers the individual flip-flops of the first register group 510 under the sequentially changed control of the ground and negative levels from the mark and space detectors Q6 and Q7. The input counter 508 produces a triggering positive transition at the middle of each code bit from the signal line. This compensates for variations in the code bit length and in the multivibrator frequency. For a character with marks as the first four code bits, first register group 510 transistors Q15–1 through Q15–4 are turned off. For a character with space as the first code bits, first register group transistors Q16–1 through Q16–4 are turned off.

*Second register group.*—The second register group 512 consists of five flip-flops REG 2–1 through REG 2–5. It stores a character until the previous code signal combination character is printed or the corresponding function is performed. As the fifth code bit is being received from the signal line, the first four code bits from the first register group 510 and the fifth code bit from the mark or space detector are shifted to the second register group 512. This shift of information from the first to second register group is accomplished as follows: The $C_1$ output of the input counter 508 provides a transition in the middle of the fifth code bit; this positive transition is used to gate the information which is stored in the first register group 510 into the second register group 512. Assume, for example, that a mark is to be transferred into the first flip-flop REG 2–1 of the second register group 512. If the flip-flop REG 2–1 is already set to mark, the upper transistor Q17–1 is off and the lower transistor Q18–1 is on. Since the same condition exists in the first flip-flop REG 1–1 of the first register group 510, the Q16–1 output lead has a ground level and the Q15–1 output lead has a negative level. Therefore, only the upper transistor Q17–1 of the second register group 512 can be turned off by the $C_1$ trigger pulse. Since it is already off, nothing happens. If a space was previously set into the flip-flop REG 2–1 of the second register 512, the upper transistor Q17–1 is on and, therefore, can be turned off by the $C_1$ triggering pulse of the input counter 508.

*Information register.*—The information register 514 is first set when new information is transferred into the second register group 512. A positive transition on the $C_1$ lead from the input counter 508 sets the information register 512. This set condition of register 512 places a ground level at one input of gate NOR 2. This level will be used later as an indication that a character is waiting to be compared.

*Strobe set register.*—The strobe set register 516 is used to transfer a new character into the comparator register group 502 and to set the strobe register 518. As soon as the information register 514 is set (new character waiting) and the strobe register 518 is reset (1st character printed or function performed), gate NOR 2 allows the strobe set register 516 to be set by the next main clock pulse and reset by the following clock pulse. When gate NOR 2 allows the strobe set register 516 to be triggered, the comparator register group 502 and the strobe register 518 are set. When the strobe set register 516 is immediately reset it resets the information register 514.

*Strobe register.*—After a character has been printed or the function has been performed, the strobe register 518 is reset as will be described hereinafter. In this reset condition coincidence gate NOR 3 is inhibited to prevent detection of coincidence between the comparator registers 502 and the comparator counter 500. Setting of the information register 514 by the next awaiting character shifting to second register group 512 now allows the strobe set register 516 to be triggered to set and then to reset which in turn again sets the strobe register 518. The strobe register 518, in set condition now (1) allows coincidence gate NOR 3 to detect coincidence between the comparator register group 502 and the comparator counter 500 and (2) inhibits gate NOR 2 to prevent setting of the strobe set register 516 until this character is processed.

*Finding coincidence*

When each flip-flop of the 64-count comparator counter 500 is set in the same binary information condition as the corresponding flip-flop of the comparator register group, the character to be printed is 32 counts (that is, character positions on the drum) ahead of the print hammer. This coincidence condition is used to start ribbon lifting. Note: if a stationary ribbon stretch were to be used, there would be no need for the 32 count delay. Six comparator network circuits N1 through N6 make up the comparator that detects coincidence.

*Comparator register group 502.*—The comparator registers CREG 1 through CREG 5 receive a character from the second register group 512 when the strobe set register 516 is triggered to the set condition. The sixth flip-flop CREG 6 of the comparator register group 502 represents case information (Letters or Figures) and determines on which half of the print drum the character to be printed is located. The comparator registers CREG 1 through CREG 5 are set if a mark condition is present in the corresponding registers REG 2–1 through REG 2–5 of the second register group 512. If a space is present in a register of the second register group 512, the corresponding comparator is inhibited and cannot be set by the trigger pulse from the strobe set register 516. The comparator registers 502 are all triggered to reset condition by the reset amplifier at the end of the printing cycle.

*Comparator.*—Each of the six network circuits N1 through N6 of the comparator network group detects the the moment when the flip-flops CC of the comparator counter 500 and the corresponding registers of the comparator register group 502 are in the same condition. For a given network circuit, this is known as a balanced condition. There are two inputs to a single network circuit from the associated comparator register, e.g., see CREG 3, and two inputs from the corresponding comparator counter flip-flop CC3 (see detail circuit in FIGURE 19). Keeping in mind that until coincidence is reached the comparator register will stay in its triggered condition, but the counter flip-flop are continually changing, in a given network circuit, balance occurs as soon as each comparator counter flip-flop has switched to the condition of the corresponding comparator register CREG. Balance is indicated electrically by a lack of current flow into the comparator network group from the common lead 520 that connects all six networks N1 through N6 to coincidence gate NOR 3. When all six networks N1 through N6 are balanced, all of the six networks N1 through N6 will block current flow in line 520 and coincidence exists. Consider the following example with respect to FIGURE 19: The third register CREG 3 of the comparator register group 502 is set so that the output lead 524 from the reset side is at a negative level. The corresponding two leads 528($C_0$) from the comparator counter flip-flop CC3 which starts its count from a reset condition respectively extend a ground level and negative level to the network N3. Current flow from the common network lead 520 will be possible so long as one of the two output leads 526 or 528 from the comparator counter flip-flop CC3 is *effectively* negative. In the example being considered, the input 522 from the comparator register flip-flop CREG 3 is at ground level and will, therefore, effectively place the diode-register junction 530 at ground level and nullify the level on lead 526 from comparator counter flip-flop CC3 connected to it regardless of whether the level on lead 526 is ground or negative. Coincidence in this specific network N3 therefore, is reached when the other level of comparator counter flip-flop CC3 on line 528 goes to ground level and nullifies the negative level on line 524 from the comparator register flip-flop CREG 3 by placing the second diode resistor junction 532 effectively at ground level. In each of networks N1 through N6 a diode 534 connected from coincidence line 520 to junction 530, and a diode 536 connected from coincidence line 520 to junction 532 permit current flow only from common line 520 to the networks. As soon as any of the diode-resistor junctions in the comparator network go to an effective negative level, coincidence is lacking.

*Coincidence gate NOR 3.*—Going back now to FIGURE 4, it is understood that the output of coincidence gate NOR 3 is normally at a ground level when the gate transistor is on. When complete coincidence occurs between the comparator register group 502 and the comparator counter 500 and the strobe register 518 is in set condition, gate NOR 3 transistor goes off and the gate output goes to a negative level for the duration of one clock pulse. The comparator output at coincidence will thus control the coincidence register 540 through gate NOR 3 only when the strobe register is set and therefore is holding gate NOR 3 open as has been described. Providing gate NOR 3 is open, the comparator output level at coincidence turns off gate NOR 3 for one clock pulse. After the one clock pulse, balance is no longer present in at least one of the networks N1 through N6 and coincidence in the entire comparator group is destroyed because at least one of the comparator counter flip-flops will have switched its two output levels. The transition from off back to on at the output of gate NOR 3 provides a trigger pulse to set the coincidence register 540 for a printable character or opens a conditioned one of gate, AND 9 through AND 14 to allow one of the function detectors to trigger the indicated function.

*Printing and spacing*

*Coincidence register.*—The coincidence register 540 allows the printing cycle to begin. Note that setting of the coincidence register 540 is inhibited for a function operation (non-printable character) by the print inhibit gate NOR 4. However, for a printable character, when gate NOR 3 sets the coincidence register 540: (1) pulses from the main clock head 92, via line 542 and diode CR90, are allowed to step the 32-count print delay counter 544; and (2) ribbon lifting is started.

*Ribbon lifting.*—So that a printed character can be read immediately after printing, the ribbon normally is below print level and must be raised momentarily each time the coincidence register 540 is set. The coincidence register 540, when set, allows high-power driver transistor Q19 to go on and supply energizing current to the ribbon lift solenoid 71, thereby causing lifting of the ribbon into the path of the print hammer.

*Print delay counter.*—As has been described, when coincidence occurs, the desirable printable character is 32 counts away from the print hammer. This delay between coincidence and printing insures sufficient time for the ribbon to be raised to print position in time to produce printing. Before the coincidence register 540 is set, main clock pulses cannot step the 32-count counter because the ground level from the set side of the coincidence register 540 back biases diode CR90 and blocks the clock pulses in line 542. When coincidence is reached and the coincidence register 540 is triggered to set, the resultant negative level from the set side will forward bias the diode CR90, allowing subsequent clock pulses to step the 32-count print delay counter 544. Within 32 counts, the ribbon will be in the proper position for printing. At the end of the 32 count, the delay counter 544 triggers a 600 micro-second print one-shot 546 (Q20 and Q21).

*Printing and spacing.*—In being triggered on, the print one-shot 546 in turn triggers the 6 ms. space one-shot 548 (Q23 and Q24) and simultaneously turns on print driver Q22. Energizing of the print solenoid 424 (by print driver Q22) and the resulting movement of the print hammer is substantially instantaneous and occurs before the spacing solenoid 60 is fully energized. Therefore, printing takes place first, followed by spacing. In being triggered on, the space one-shot 548 turns on space driver Q25, energizing the space solenoid 60 and the physical spacing is done by the aforedescribed mechanics of the printer.

*Special reset, print inhibit gate, and reset amplifier.*—Except for carriage return, any machine function can be performed in less time than it takes to receive one character at 200 w.p.m. Since the usual message format includes line feed after a carriage return, the time allotted for physically returning the carriage (about 110 ms.) is compensated by performing the line feed function before carriage return is finished. Additional time to complete carriage return is provided by having the described two groups of character registers for storage.

As soon as a carriage return function is detected by gate AND 3, the print inhibit NOR 4 is opened by the negative input level from AND 3. With inhibit gate NOR 4 transistor Q26 turned on, its amplifier transistor Q27 is turned off. The resultant negative level output from Q27: (1) inhibits setting of the coincidence register 540; and (2) prepares gate AND 15 so that it can pass the coincidence pulse for a reset operation. When coincidence occurs, a 110 ms. carriage return one-shot 550 is triggered by the coincidence pulse through gate NOR 3 through function gate AND 10. Also gate NOR 3 provides a negative input level to gate AND 15 and the resulting negative level output from gate AND 15 turns on a transistor Q28. A timing capacitor in the special reset 552 couples the resulting positive level output into transistor Q29, turning it off. After a time delay of about 1 ms. (see FIGURE 18 where time delay is determined by the values of capacitor C1 and resistor R1) the capacitor has discharged sufficiently to cause Q29 to turn on again. At the start of the 1 ms. delay, Q29 opens the reset inhibit gate NOR 5 to initiate a reset action by turning off reset amplifier Q30. At the end of the 1 ms. delay, Q29 closes reset inhibit gate NOR 5 to allow Q30 to turn on and: (1) reset the comparator register group 502; (2) reset the strobe register 518; and (3) reset the coincidence register 540. As soon as the foregoing input circuits are reset by the reset amplifier Q30, the following character (received code combination) can be switched into the comparator register group 502. In the above example, the following code combination is "line feed," a function, and can be acted upon as soon as coincidence is found. If automatic line feed is used, the reset inhibit gate NOR 5 could be inhibited while the carriage return one-shot is on.

Other characters for which the special reset is used are letters shift, figures shift, motor stop (that is, upper case H), and blank. No mechanical action is required of the printer mechanism for any of these functions and therefore the following character can be processed immediately.

The remaining functions bell, space, and line feed have separate inputs to reset inhibit gate 5. These inputs come from the one-shots that control the functions and are designed to delay resetting until the corresponding function is completed. This is necessary to avoid loss of a function when two or more are received consecutively. Delaying resetting until the function is completed prevents triggering of the function one-shot before it returns to normal.

*Case register.*—The case register 554 determines whether the printer will print letters or figures. When the LTRS or FIGS code is registered in the comparator register group, it opens gate AND 2 which prepares function gate AND 9 to pass the coincidence pulse. When coincidence occurs, the coincidence gate NOR 3 provides the transition necessary open gate AND 9 to set or reset the case register 554, depending upon the third code bit information in clamping information line $3_1$, or $3_0$. The case register 554 remains in one or the other case condition until the opposite LTRS or FIGS shift character is received. The case register 554 inhibits or permits setting of the case flip-flop (CREG 6) of the comparator register group 502. When a manual LTRS switch S17 is closed momentarily, the case register 554 is set to provide a letters indication to case flip-flop CREG 6. The collector of transistor Q32 is momentarily clamped at ground level by depressing manual switch S17, causing the set side transistor Q32 to go on and remain on.

*Function detectors.*—Detector gates AND 3 through AND 8 recognize the codes for carriage return, motor stop, bell, line feed, blank, and space respectively. When a function is detected at a function detector, one of the gates AND 3 through AND 8 opens and prepares a corresponding one of the function gates AND 10 through AND 14 to trigger a particular function one-shot when coincidence occurs. Print inhibit gate NOR 4 is opened by the function detector to inhibit setting of the coincidence register 540 which prevents both the subsequent lifting of the ribbon and printing.

*Carriage return.*—In addition to print inhibiting, when a carriage return code is detected, detector gate AND 3 provides a negative input level to function gate AND 10. When coincidence gate NOR 3 swings positive, after swinging negative as coincidence is found, CR function gate AND 10 triggers the carriage return one-shot 550. Gate AND 15 triggers the special reset which resets the input circuits after a short delay. Whenever ground level is applied on CR trigger line 556 it triggers the carriage return one-shot 550 and, through gate SOR 1 (see FIGURE 21) also triggers the space 6 ms. one-shot 548 to remove the space pawl from the space rack during carriage return. This ensures rapid initiation of space pawl movement while a parallel circuit line 558 from the high power carriage return driver 50 maintains the space solenoid energized until the carriage return one-shot 550 is turned off. As soon as the carriage reaches the left hand margin, reed switch S22 (magnetically operated) is closed, clamping the output from the set side of the carriage return one-shot 550 to ground level, which triggers it to reset condition and immediately turns off the CR driver which immediately de-energizes the space solenoid 60 and the CR magnetic clutch coil 292. When a carriage return is initiated by closure of a manual CRG RET switch S19, or by magnetic closure of the right hand margin reed switch, the carriage return one-shot trigger line 556 is momentarily grounded and the carriage return one-shot and the space one-shot are triggered directly.

*Line feed.*—When a line-feed code is detected, detector gate AND 6 provides a negative input level to line-feed function gate AND 13. When coincidence gate NOR 3 swings positive after swinging negative as coincidence is found, line-feed gate AND 13 triggers the line-feed one-shot 562. Driver transistor Q52 turns on and supplies energizing current to the line-feed solenoid 146. While on, the line-feed one-shot 562 opens reset inhibit gate NOR 5 to prepare the reset circuits. When a line-feed is initiated by closure of the mode panel line feed switch S20, the line-feed one-shot 562 is triggered directly by the switch. Whenever a carriage return is initiated by a trigger pulse in line 556, if automatic line-feed is desired, the line-feed one-shot 562 can be energized through a gate SOR 2 (shown in phantom).

*Blank.*—When a blank code is detected, detector gate AND 7 provides a negative input level to blank function gate AND 15 directly through print inhibit gate NOR 4. Blank function gate AND 15 triggers the special reset amplifier Q28 when the coincidence pulse opens gate NOR 3. After the short delay of the special reset 552, the reset amplifier Q30 is turned on to reset and prepares the input circuits for processing of the next character.

*Space.*—When a space code is detected, detector gate AND 8 provides a negative input level to space function gate AND 14. When coincidence gate NOR 3 swings positive, after swinging negative as coincidence is found, gate AND 14 triggers the 15 ms. space delay 564. This 15 ms. delay insures that the spacing action required for the previous character will be completed before the space one-shot 548 is triggered again. While on, the space delay one-shot 564 turns on gate NOR 5 to prepare the reset circuits.

*Line break.*—A normally closed on-off, line break switch S18 is used to start the printer motor B1 locally. The break contacts of the switch are in series with the signal line. When the switch is depressed, the signal line is broken to switch the line from mark to space. The space condition on the signal line causes the receive oscillator in the printer to stop and thereby allow the input counter of the printer to start the motor.

The motor control circuit provides an automatic start for the motor when the first incoming character is received or when the line break switch S18 is used. The motor will stop two minutes after the last character is received, by means of a timing network that causes the motor stop relay K1 to de-energize.

When a start pulse from the first incoming character starts the input counter, the input counter $C_1$ output, in the middle of the fifth code bit, sets the motor stop register 563, energizing motor stop relay K1, allowing the motor to start. The $C_1$ output also triggers a 35 ms. reset one-shot 564 which through relay $K_2$, turns on a 2-minute one-shot 566. Normally-on transistor Q38 in 2-minute one-shot 566 turns off, allowing transistor Q39 to turn on. At even the slowest line rate of 60 w.p.m., the 35 ms. reset one-shot 564 will be turned on frequently enough by the input counter to prevent the timing capacitor in the 2-minute one-shot 566 from charging sufficiently to allow Q38 to turn on again. However, between messages, the reset one-shot 564 remains off and the 2-minute one-shot 566 returns to normal to reset the motor stop register 563 and thereby stop the motor B1. In the two one-shots 564 and 566, the size of the timing capacitors is kept low by increasing the value of their associated resistors in the RC networks. With the resulting high resistance in the base circuits of transistors Q34 and Q38, additional transistors Q33 for the reset one-shot and Q36 and Q37 for the 2-minute one-shot are necessary. They provide, in effect, enough current application to allow Q35 and Q38 to be turned off through cross-coupling resistors.

*Dual hammer electronics*

The electronics schematic block circuit, shown in FIGURE 20, represents an example of control and operating circuitry for a dual hammer drum printer in which the drum is continuously rotating and the hammer carriage with two print hammers and associated operating electromagnets is stepped across in front of the drum. A dual hammer printer involves problems not present in the single hammer printer. To realize operational speed advantages of a dual hammer drum printer, each mechanical spacing actuation will step the hammer carriage two character spaces. Accordingly the space rack 254 for the dual hammer carriage, is modified so it (FIGURE 1) has its teeth spaced apart two character spaces and, each time the pawl assembly 252 is actuated by the space bail 256, the print hammer carriage assembly 54 mechanically shifts two character spaces to the right. By such an arrangement the intermediate character space function is wholly electronic, i.e., by shifting steering control circuits from hammer #1 to hammer #2 and determining when and if the two hammers are operated.

Since the number of mechanical character spacing steps per line, in the dual print hammer embodiment, has been halved, the average w.p.m. printing speed, which is really dependent upon the mechanical spacing, can be at least doubled, in other words, the printing speed can be increased to at least 400 w.p.m.

Because every other spacing is electronic and the alternate spacing operations involve a mechanical operation, an arrangement must be made in the printer electronics for determining and controlling which of the number 1 and number 2 print hammers will operate at any specific instant and whether electronic effective spacing or mechanical carriage spacing is in order. This is accomplished through a steering register and a space control register, as will be hereinafter described. The electronic spacing consists of a shift of space control from electronic spacing, when the electronics are in steering #1 condition, to mechanical spacing after the steering register is in steering #2 condition and when a print or space code combination signal has been processed through to actuation by the electronics.

Carriage return resets steering to steering #1, therefore the #1 print hammer detector is always the first detector to be reset so that the #1 print hammer will always operate when the carriage has returned to its start-of-line position in order to assure that all first printed characters of every line are vertically aligned on the record paper. The #1 hammer is chosen instead of the #2 hammer to avoid losing an available left-hand print position in the line. The foregoing aspects, together with others which will become apparent, necessitates circuitry materially different from that of the single print hammer drum printer, it being apparent that a mere duplication of the electronics shown in FIGURE 4, without considerable additional circuitry will not suffice to accomplish proper dual hammer printer operation. The disclosed dual hammer circuit is one way to accomplish desired control and operation with a minimum number of electronic components.

The illustrated circuit in FIGURE 20 accomplishes an essentially simultaneous feed of two successive signals to two parallel comparator circuits. Furthermore, it is feasible and actually is possible in the exemplary electronics, that two successive incoming code signal combinations each representing the same "character to be printed" can be simultaneously compared in the electronics to result in simultaneous actuation of both print hammers. It is therefore possible, in the "special" condition just reiterated, for both the #1 and #2 print hammers to be actuated by a single character pulse at the associated coincidence point of rotation of the print drum. On the other hand other sequences of reception could require from approximately 5.5° of rotation to 354.5° of rotation of the print drum to print the #1 and #2 characters depending upon their sequential reception. An example of a 354.5° drum rotation between printing is the printing of the symbol S received immediately after the symbol I has been received and printed. Either hammer can print first once two signal combinations are stored and being compared and whichever hammer is operated second will result in mechanical spacing through the space control 636, as will be described.

*Clock pulses and comparator counter*

As in the single hammer printer electronics, the index clock 90 and the main clock 92 supply the indexing and character position pulses, corresponding to print drum rotation, through amplifiers to a 64 count comparator counter 600 having six (6) flip-flop stages. The two outputs from each flip-flop of the comparator counter 600 have branch leads connected in parallel to dual comparator network groups 602 and 604, also identified as #1 and #2. Each network group includes a plurality of comparator network circuits similar to those described in detail for the single printer electronics.

Incoming code signal combinations may be derived: (1) through data lines from a tape reader which transmits on 6 parallel lines for the Baudot code; or (2) parallel code signal combination information can be fed into the printer electronics from a buffer register system utilizing two or more storage register groups as in the electronics of FIGURE 4. Incoming parallel signal lines are designated as $D_0$ through $D_5$, the first 5 lines enabling passage to the receiver of the five bits of information in the conventional Baudot code and the $D_5$ line carrying case register information, when the latter is supplied from the external transmitter.

Information is transmitted from the external transmitter (or buffers) to the receiver in parallel form, a strobe pulse being generated by the transmitter (or the buffers) to signify the presence of a new character placed on the data signal lines $D_0$–$D_5$. A ready busy (R/B) register 606 with associated information output circuits back to the transmitter circuitry, is used to insure against the loss of a character. When the comparator portion of the electronics is busy accepting an incoming character, the transmitter (or buffer) is inhibited from transmitting the next character on input signal lines $D_0$ through $D_5$ because of a busy signal output fed back from the R/B register 606 in busy (set) condition. When the electronics are in steering #1 a signal from the lower output of R/B register 606 shifts the incoming code combination into the comparator register group 601, and in the absence of a print inhibit signal, simultaneously resets the R/B register 606 which demands another code signal combination from the transmitter which in turn places the next code signal combination information on input signal lines $D_0$–$D_5$ and sends a strobe signal to again set the R/B register. From the time the first code combination is triggered into the comparator register group 601 until the next code combination is imparted to signal input lines $D_0$–$D_5$ is substantially instantaneous, thus permitting two code signal combinations to be stored in the comparator at the same time.

Each of the incoming parallel signal lines $D_0$–$D_5$ includes two amplifiers arranged as mark and space detectors. Whenever there is a mark signal coming in on any one of the signal input lines D, the 1st or mark detector transistor Q100 associated with that line is kept on. A space condition on the signal line is a no current condition allowing the mark detector transistor Q100 to turn off and the space detector transistor Q102 is then turned on by the turning off of the mark transistor. The code signal combination information input is simultaneously received on each of the six (6) mark and space detector amplifiers inputs and, depending upon mark or space information levels the mark and space detectors condition associated ones of the six flip-flops CREG 1 through CREG 6 of the comparator register group 601 to either unclamp the reset side (mark) or the set side (space), respectfully, of associated register flip-flops. The upper and lower set and reset, outputs from each of the comparator register stages CREG 1 through CREG 6 are conected to two individual inputs of an associated one of a comparator network circuit N1L through N6L of the first comparator network group 602.

The output lines $D_{0m}$ through $D_{5m}$, from the mark detectors, and lines $D_{0s}$ through $D_{5s}$, from the space detectors, are also directly connected, as shown in FIGURE 20C, to inputs of the associated individual network circuits N1R through N6R of the second comparator network group 604. Whenever an incoming code group is received in the receive amplifier detectors, the resulting levels on lines $D_{0m}$ through $D_{5m}$ and lines $D_{0s}$ through $D_{5s}$ clamp either the set or reset sides of the six stages of the comparator register group 601 as well as being applied to the input leads of the second comparator network group 604. The applied clamping levels to the comparator register group 601 will not effect the condition of its stages CREG 1 through CREG 6 unless the stages are triggered.

Assuming steering #1 condition—when the strobe signal is applied to set the ready busy register 606, the register goes busy, applying a negative level on its upper output which: (1) sends back a busy signal to the transmitter (or buffer); and (2) unlocks the function gates AND 3, AND 5, AND 7, AND 19, AND 20. Note: function gate AND 11 is not controlled by this negative level. The lower output of the ready/busy register 606 goes positive and is applied through a 500 micro-second delay 616 to send a negative transition signal through comparator register trigger gate AND 1, the output of which is connected to the trigger circuits of all six of the comparator register flip-flops, CREG 1 through CREG 6, and triggers the applied code information into temporary storage in the comparator register stages which now apply appropriate binary information signal levels to the #1 comparator network 602.

The changing binary information output from comparator counter 600 results from main clock pulses and represents the character positions on the drum. Thus, when the levels on its flip-flop stage leads come into coincidence with all the stored signal levels on the output leads from the comparator register group 601, the entire #1 comparator network group 602 becomes balanced, as has been described for the network of the single print hammer printer in FIGURE 4. This balanced condition applies a positive-negative swing or double transition pulse on the #1 coincidence line 608, as the #1 network momentarily goes into balance and then out of balance because of the next count. This #1 coincidence pulse is applied to the base of the #1 coincidence amplifier 610.

The comparator register trigger pulse, from opened trigger gate AND 1, was also simultaneously applied through a R/B reset gate SOR 1 to reset the ready/busy register 606. As described above, the incoming detectors have now received and effectively store the next successive code signal combination which is applied as opposed levels to associated pairs of inputs to each network circuit of the #2 comparator network 604. If the two code signal combinations which are now being applied respectively to the #1 and #2 comparators represent identical characters, coincidence will simultaneously occur in the #1 and #2 comparator networks 602 and 604 as the comparator counter flip-flops reach the count represented by the code signal character. Both networks go into balanced condition and coincidence pulses in both coincidence lines 608 and 612 are applied to the bases of #1 and #2 coincidence amplifiers 610 and 614. This represents the special character repeat condition that can be processed to simultaneous printing only when the electronics are in steering #1. If the succeeding signal combination is different from the preceding one, coincidence occurring in the #2 coincidence network can also be processed further because the electronics have switched to steering #2 as will be described.

The transition to positive level from the lower output of the ready/busy register 606, when it has been set by the strobe pulse, pulses through the 500 micro-second delay 616 and thence through the comparator register trigger gate AND 1. The same negative output level from the delay 616 is applied to a print detector reset gate AND 18, which is unlocked by a normally negative output of print inhibit gate NOR 1, and: (1) applies a negative level to the reset sides of both the #1 print detector 618 and #2 print detector 620; and (2) also applies a negative level to an input of an electronic space gate AND 2, which will be referred to hereinafter simultaneously with triggering of the comparator register group 601 and the reset trigger pulse through print detector gate AND 18 to the reset sides of the two print detectors 618 and 620, the steering register 622 was first in set (or steering #1) condition. The lower output of steering register 622 is connected to the #1 print detector 618 reset inhibit input and the upper register output is connected to the #2 print detector 620 inhibiting input. When steering 622 is set, in steering #1, its lower output is positive and unclamps the reset side of #1 print detector 618 so the reset pulse from gate AND 18 triggers only the #1 print detector to the reset condition while the upper output from the set steering register 622 having clamped the reset side of #2 print detector 620 which cannot then be effected by the reset pulse from gate AND 18.

At the same time that print detector #1 is triggered to reset condition, the comparator register trigger pulse through gate AND 1, which is applied to R/B reset gate SOR 1, is also applied through a steering register reset gate SOR 9 resulting in a transition trigger pulse which resets the steering register 622 to steering #2 condition, clamping the reset side of print detector #1 and unclamping the reset side of print detector #2. Note: at this stage, print detector #1 has already been triggered to reset while print detector #2 remained in set condition.

With the #1 print detector 618 now reset, the lower negative level output from its reset side is applied to unlock the #1 print driver AND gate 14. The #1 comparator network 602, going into coincidence balance, applies a coincidence signal through #1 coincidence amplifier 610 which sends a negative level through the number 1 print driver and gate 14 which coincides with an input pulse from the main clock amplifier corresponding to the appropriate character that supplies a negative level to both the #1 gate AND 14 and the #2 gate AND 15. The negative transitions of the same main clock pulses which determined coincidence in respective comparator network 602 and 604 opens the unblocked #1 print driver gate AND 14, for example, which closes, as the coincidence pulse swings positive, and the resultant positive transition from gate AND 14 triggers the 1 ms. #1 print driver one-shot 628, turning on the #1 print driver amplifier Q75 and energizing the #1 print hammer solenoid 422. Note: if the #2 coincidence amplifier 614 passes a coincidence signal to the number 2 print driver and gate AND 15 before #1 coincidence is found, the #2 gate AND 15 will open if the #2 print detector 620 has been reset by a reset pulse during steering #2 condition because there is then a negative level applied to gate AND 15 from the reset side of the #2 print detector 620.

When the #1 print driver one-shot 628 is triggered, the output level from the set side transistor Q73 applies a negative level: (1) to trigger the #1 print detector 618 to set condition; and (2) to one input of special gate AND 13 for 1 ms. The #1 print detector outputs now switch and the upper level output applies a negative level to unlock function gates AND 4, AND 6, AND 8, and AND 16 for purposes to be hereinafter described. Prior to this point the steering register 622 had been reset to steering #2, and had unclamped the reset side of #2 print detector 620 so that the next following strobe pulse to the ready/busy register 606 applied a positive going pulse through the 500 micro-second delay 616 which sent a negative transition to open the gate AND 18 and again applies a trigger pulse to the reset side of both print detectors. Since, in steering #2 condition, #2 print detector 620 is unclamped, the reset pulse from gate AND 2 will have triggered the #2 print detector to the reset condition. Print detector #1 may or may not be reset at this point, depending whether or not the preceding code signal combination was a character. The result of resetting #2 print detector 620 is a negative level applied from the detector to an input to the #2 print driver AND 15. Other conditions applied to #2 gate AND 15 being negative, the coincidence condition output of #2 coincidence amplifier 614 which occurs upon drum position coincidence for the signal combination stored in the receive amplifier detectors, opens #2 gate AND 15 and triggers the #2 print driver one-shot 630, turning on the #2 print driver amplifier Q78 to energize the #2 print solenoid 422, which in turn triggers the #2 print detector back to its set condition.

If the two characters just printed were identical, both comparator networks 602 and 604 would have provided simultaneous coincidence signals to both the #1 and #2 coincidence lines, with the result that, with both the #1 and #2 print detectors in reset, both of the print one-shots can be triggered at the same time. When this special condition occurs, negative level outputs from the upper transistors of the two triggered print driver one-shots 628 and 638, are simultaneously applied to the special gate AND 13, opening that gate which bypasses the space gate AND 8 and applies a trigger pulse directly through the space driver gate SOR 4 to trigger the space driver one-shot 632, energizing the space driver transistor which energizes the space solenoid 60 to accomplish mechanical spacing. As in the single hammer printer, printing movement is accomplished long before the space solenoid 60 is completely energized.

A positive going output from the triggered space one-shot 622, triggers a space cover up one-shot 634 which in turn applies a positive level signal to inhibit the two print driver gates AND 14 and AND 15 and to also inhibit the space function gate AND 8, for approximately a twenty-five (25) millisecond delay while mechanical spacing is occurring and, at the same time, is applied through gate SOR 8, to set the steering register 622 and, through gate SOR 6, to reset the space control register 636. This is the only instance when the special gate AND 13 is open, that is, when two successive receive signals are the identical or repeated characters, and the first one is received while steering #1 condition is present. Otherwise the special gate AND 13 is normally inhibited during printing by normally positive outputs from one or the other or both of the print driver one-shots 628 or 630.

*Space control*

Gate AND 8 is the space function gate having five (5) inputs. The upper input is a normally negative level output from a carriage return cover register 650. A second input is also from a normally negative level output from a space cover register 634. A third input is from the lower side of the steering register 622 and is at a positive blocking level in steering #1 and is at an unlocking negative level in steering #2. A fourth input, as has been described, is from the upper output of #1 print detector 618 and goes negative after #1 printing occurs and the #1 print detector is in set condition. The fifth input to space function gate AND 8, is the output from a space detector gate AND 7. Thus, after the #1 print hammer has been actuated, gate AND 8 is conditioned to go open if the succeeding code signal is a SPACE signal, but if the electronics are in steering #1 or the #1 print one-shot 628 is not yet triggered, the space function gate AND 8 is blocked and cannot be opened by a received space signal which, as has been described, will by-pass the coincidence networks and pass directly to the space detector gate AND 7.

*Space control register*

Assuming now that the carriage is spaced and two characters are waiting for coincidence to occur whereupon printing will take place, the reset condition of each of the #1 and #2 print detectors results in application of a negative level detector output through separate circuits to a space control gate SOR 5 to the set side input of a space control register 636. Now, the first one of the #1 or #2 print driver one-shots 628 and 630 to be triggered results in a positive going transition in the output circuit from the associated print detector to the gate SOR 5 when the detector goes to set condition. The positive transition, applied through either of the separate circuits to space control gate SOR 5, will trigger the set side of the space control register 636. At the same time the positive going transition, which was applied to gate SOR 5, is also applied through one of parallel circuits to space driver gate SOR 4. If the space control 636 had been previously set, by a pulse from one of the print detector 618 or 620, the pulse to gate SOR 4 from the second of the print detectors 620 or 618 will trigger the space driver one-shot 632. Note that each of these two bypass circuits to gate SOR 4 includes an inhibit device 640 and 642 (see FIGURE 43) subject to a negative inhibiting level from the reset side of space control register 636 when in reset condition. However, with the space control 636 triggered to the set condition, by the first of the two print detectors going to set condition upon firing of its associated print one-shot, there is no inhibiting level on the inhibit circuits 640 and 642 so the triggering pulse from the second (#1 or #2 print detector to go to set when its print driver one-shot fires, can be applied without inhibition to the space driver through gate SOR 4.

The space control register 636 is triggered to the reset condition, after actuation of a mechanical spacing operation, by the output of space cover one-shot 634 and applies a negative inhibiting level to the inhibit circuits 640 and 642 connecting to inputs from print detectors #1 and #2 to space driver gate SOR 4. The space control register 636, depending upon its condition, will control triggering of the space one-shot 632 when the second of the two print hammers is energized by its associated print one-shot.

The space control register 636 is also used to coordinate several machine functions with desired electronic or mechanical spacing actuation and it is always reset by the space cover register 624 whenever a mechanical spacing has occurred so the next print operation (excepting for the aforedescribed special condition) cannot pass a signal through gate SOR 4 to trigger the space one shot 632.

*Electronic spacing (dual hammer)*.—The space control register 636 is reset whenever the electronics are in steering #1 and must be triggered to set condition whenever the first printing occurs or whenever an electronic spacing action, due to a received "space" signal shifts steering from #1 to #2.

Upon the reception of a "Space" signal, a trigger pulse from space detector gate AND 7 is applied to an electronic space gate AND 2. The other inputs connect to gate AND 2, one from the set side of steering register 622, negative when in steering #1, and the other from the 500 microsecond delay 616. Electronic space gate AND 2 can only be opened when: (1) the steering register 622 is in steering #1 condition, (2) space detector gate AND 7 passes a space signal and (3) the pulse from 500 microsecond delay 616, which triggers the comparator register group, occurs. Opening the electronic space gate AND 2 applies a trigger pulse through: (1) gate SOR 1 to reset the R/B register 606; (2) gate SOR 2 to reset (steering #2) the steering register 622; (3) and gate SOR 5 to set the space control register 636 which opens the two inhibit circuits 640 and 642 from the print detectors to the space one shot gate SOR 4, conditioning the circuits to permit the following positive going pulse, which now can only come from the reset side of print detector #2 when it is triggered to set, to be applied through the gate SOR 4 to trigger the space one shot 632. Note: triggering the steering register to reset (steering #2) by electronic spacing, or the firing of the first of the two print one-shots when two characters are to be printed accomplishes electronic spacing by shifting the space control register 636 to its set condition.

*Functions*.—Comparator register trigger gate AND 1, which permits the time delay trigger pulse from the ready busy register 606 to trigger the comparator register flip-flops, and the print detector reset gate AND 18, which permits the time delay trigger pulse to be applied to trigger the reset side of the two print detectors, are both controlled by the output level (normally negative) of reset inhibit gate NOR 1 and if the reset inhibit gate NOR 1 is inhibited by any of its six input circuits both the comparator register trigger gate AND 1 and print detector reset gate AND 18 are blocked and there can be no printing by either the #1 or the #2 print hammer.

*Reset inhibit*.—Inhibit gate NOR 1 provides an inhibiting output level upon having applied thereto an output signal from any one of the function detector gates AND 3, AND 5, AND 7, AND 9, AND 11, and AND 20.

The function detector gates are unlocked whenever the ready-busy register 606 is in the busy condition (set), placing a negative level on an input to each of the detector gates. The detector gates have appropriated coded inputs from the mark and space detector outputs of the receive amplifiers. Thus, when a strobe pulse triggers the ready/busy register 606 and the incoming code combination is applied to the signal input lines $D_0$–$D_5$, the function detector gates are also unlocked and if the received code combination is a function signal, the appropriate function AND gate will open and place a negative level on its output. This negative level output from an opened function detector AND gate is applied to the reset inhibit gate NOR 1 and inhibits the trigger gate AND 1 and the print detector trigger gate AND 18 for a sufficient period to prevent the 500 microsecond delayed pulse from delay 616 from opening either one of gates AND 1 and AND 18. Blocked gate AND 1 prevents a signal pulse through it to the reset gate SOR 1, and back to the ready busy register 606 and thereby delays resetting the ready busy register until it can reset after operation of the particular function by circuits to be described.

*Line feed.*—If the line-feed detector gate AND 3 detects any line-feed code signal combination in the outputs of the receive amplifiers, gate AND 3 will open as it has been unlocked when the strobe pulse sets the ready busy register 606. Since open gate AND 3 inhibits the trigger signal to the print detectors and the comparator register, the output level from the set side of #1 print detector remains negative and unblocks the line-feed driver function gate AND 4. The output of the line-feed cover one-shot 644, which at this point is in reset condition, is negative, also unblocking the gate AND 4. Therefore, as soon as the line-feed function detector gate AND 3 opens it applies a negative level to open line-feed function gate AND 4 and apply a triggering pulse through line-feed gate SOR 2 to trigger the line-feed one-shot 646, turning on the line-feed driver transistor and energizing the line-feed solenoid 146, permitting a line-feed function to occur by the mechanics of the printer. Note: if the line-feed signal combination was the second one of a pair of signal combinations in which the first required a printing operation, the #1 print detector will be reset and its upper positive level output clamps the line-feed function gate AND 4 until the #1 hammer is actuated.

When the line-feed one-shot 646 turns on, it triggers the line-feed cover one-shot 644 which remains energized for a sufficient time to apply a positive blocking level to the line feed gate AND 4, preventing a succeeding line-feed signal to again operate the one-shot 646 during a line feed operation. The positive level output of the triggered line feed cover one shot 644 is also applied to the print driver gates AND 14 and AND 15 to inhibit opening of either of those two gates while the line feed function is occurring. When line feed cover one-shot turns off, its positive output transition applies a pulse through reset gate SOR 1 to reset the ready busy register 606.

Manual line feed is enabled through a switch S50 applying ground level through gate SOR 2 to trigger the line feed one shot 646, and the above described line feed operations will occur.

*Blank.*—The blank detector gate AND 9 is unlocked when the ready busy register 606 is set by the strobe pulse and if the "blank" signal code combination is present on the receive amplifier outputs, blank detector gate AND 9 will open, inhibiting the reset inhibit gate NOR 1, and applying a pulse to a special blank reset gate AND 10 and sends a reset pulse through the reset gate SOR 1 to reset the ready-busy register 606 enabling the next code signal combination to be immediately received.

*Case register.*—In the event that the transmitting equipment does not transmit the sixth pulse, which represents case information, the case register 648 will be used to control the condition levels on the mark and space detector lines. The case detector gate AND 11 has no blocking input from ready/busy register 606, but passes the first, third, fourth, and fifth code bits of a case information code signal, immediately upon their reception in the receive amplifiers.

Signal lines from the second code bit, indicating space and mark, are connected to respectively inhibit the set and reset sides of the case register 648 which is triggered by opening of case detector gate AND 11 through gate SOR 7 to the reset side. This latter gate SOR 7, is utilized to enable a manual switch S51 to be closed, when desired, to apply a ground level to only the reset side of case register 648 which clamps the register in a letters position. The register remains in whichever position it was last triggered until the next case shift signal is provided.

The case detector gate AND 11 applies an inhibiting signal to the reset inhibit gate NOR 1 and also unlocks special case reset gate AND 12 so the associated 500 microsecond delay trigger pulse will open gate AND 12, sending a signal back through the reset gate SOR 1 to reset the ready/busy register 606.

*Space.*—A space code combination signal on the incoming signal lines will open the unblocked space detector gate AND 7, sending a negative level on its output to: (1) the space function gate AND 8; (2) to the reset inhibit gate NOR 1; and (3) to unblock electronic space gate AND 2, as has been described. If at this point, the steering register 622 is in steering #1 condition, a negative level output is being applied to an input of electronic space gate AND 2, conditioning it to be opened. The trigger pulse from the 500 microsecond delay 616 now opens the electronic space gate AND 2, applying a transition pulse through gate SOR 9 to trigger steering register 622 to reset its steering #2 condition. As has been described, this electronically spaces from the #1 print hammer to the #2 print hammer by clamping and preventing resetting of the #1 print detector 618.

When the steering register 622 is in steering #1 condition, its lower output is at a positive level which locks a CR special reset gate AND 17 and also locks the space function gate AND 8 preventing the space function signal, which is now present from space detector gate AND 7, from opening the space function gate AND 8. The space function gate AND 8 can also be blocked if print detector #1 is in the reset condition, ready for a print signal to be applied to the #1 print driver. Space function gate AND 8 can also be blocked by a signal from the space cover one-shot 634 while it is in the on condition, to prevent loss of a space function while a preceding space function is occurring.

If, however, the printer is in steering #2 condition, gate AND 8 is conditioned to open when a pulse is received from the space detector gate AND 7, applying a trigger pulse through amplifier Q47, then through space driver gate SOR 4 to trigger the space driver one-shot 632 in the manner which has been described.

*Carriage return.*—When a carriage return code signal combination is placed on the receive amplifier outputs it is applied through carriage return detector gate AND 5 which has been unblocked when the ready/busy register 606 is set upon receipt of the strobe pulse. Carriage return detector gate AND 5 passes a trigger pulse to the carriage return function gate AND 6, it also pulses a line to the reset inhibit gate NOR 1 and to two carriage return special reset gates AND 16 and AND 17. Through one or the other of special reset gates AND 16 or AND 17, depending upon which print hammer was last actuated, the carriage return function pulse is applied through steering gate SOR 8 to trigger the steering register 622 to set steering #1, so the machine will be in steering #1 condition after any carriage return signal.

It is assumed at this time, that both print detectors are set and, because of the CR signal, are inhibited from receiving a reset trigger signal. The carriage return function gate AND 6 is unblocked so long as a previous carriage return is not occurring which would result in the carriage return cover one-shot 650 applying a positive blocking level on gate AND 6. Accordingly, a carriage return negative level pulse from the carriage return detector gate AND 5 opens carriage return function gate AND 6, passes through an amplifier and the positive transition of the pulse passes gate SOR 3 to trigger the carriage return cover one-shot 650. This one-shot 650, besides applying a positive level output to block its own gate AND 5, turns on the carriage return driver amplifier to energize the high power carriage return driver transistor 652, energizing the magnetic clutch 292 and permitting printer mechanics to accomplish carriage return.

It will be recalled that the space bail must be retracted during carriage return movement. Accordingly, the amplified CR trigger signal from CR function gate AND 6 is also applied through the space driver gate SOR 4 to trigger the space driver one-shot 632. This dual triggering enables an immediate energization of the space solenoid 60 by its 6 ms. one-shot. The space solenoid 60 is then held in an energized condition during the remainder of a carriage return cycle by means of a by-pass circuit 654 connected from the high power carriage return driver transistor 652 to the space solenoid energizing circuit through a diode 656. In this manner the space driver does not have to be maintained in an "on" condition during the entire time required to accomplish a carriage return function.

When the carriage reaches the left-hand margin position, the left-hand margin reed switch S52 is magnetically closed, applying a positive level to the output of the set side of the carriage return cover one-shot 650, immediately turning off the one-shot 650 and de-energizing the driver 652 and the magnetic clutch 292. This also de-energizes the space solenoid 60, whereupon, the space bail permits the space pawl to move up and engage the space rack to main the carriage in its left-hand margin position.

If automatic carriage return and line-feed is desired the right-hand margin reed switch S53, when closed magnetically as the carriage reaches the right-hand margin position, applies ground, through carriage-return gate SOR 3, and line-feed gate SOR 2 to trigger the carriage return cover one-shot 650 and the line-feed one-shot 646 which will accomplish the carriage return and the line-feed functions, as have been described hereinbefore.

Application of the negative level from triggered carriage return CR one-shot, through a circuit to the bell warning switch S23 and bell driver gate SOR 18, inhibits triggering of the bell driver one shot 660 as the carriage moves back over the reed switch S23. Normally, the carriage return one-shot 650 is applying a ground level to the bell warning (approaching end-of-line) switch S23 so that closing of the bell reed switch S23 as the carriage approaches end-of-line will apply a positive going pulse through gate SOR 18 to trigger the bell driver one-shot 660, which, through its driver transistor, energizes the bell solenoid coil 662. Output lines from the bell driver one-shot 660 are utilized to temporarily block the print driver gates AND 14 and AND 15, also send a negative level pulse to the reset gate SOR 1 thereby resetting the ready busy register 606.

To accomplish manual carriage return, a manual carriage return switch S54 is closed, sending a ground level signal through carriage return gate SOR 3 to trigger the carriage return cover one shot 650. Closing of either the magnetic CR switch S53 or manual switch S54, also applies the ground level through the space driver gate SOR 4 to trigger the space driver one shot 632. Thereafter the carriage return mechanical function occurs as has been previously described.

While the 140 ms. carriage return cover one-shot is on, a positive level from its lower output blocks both of print driver gates AND 14 and AND 15, and when the carriage return cover is turned off the negative going transition triggers the reset side of the space control register 636 through gate SOR 6.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Electronic converter and control apparatus in a page printing telegraph receiver including a continually rotating type carrier, a position indicator for producing position signals that characterize the position of the type on the type carrier, and a comparing apparatus which compares the position signals with the transmitted telegraph bit groups and releases the required functions in the printing mechanism on determination of coincidence, comprising: a series-parallel converter to convert each incoming telegraph bit group into parallel form; a comparing register in which the telegraph bit group converted into parallel form is stored; a position register in which the position signals are recorded one after the other in parallel form; and a comparing circuit means, connected to the output of the comparing register and to the position register, having means to emit a triggering signal at its output on determination of coincidence between the contents of both registers.

2. Electronic converter and control apparatus as defined in claim 1, wherein the series-parallel converter contains a first storage register with signal inputs and control inputs and a bit counter with each received telegraph bit fed in parallel to said signal inputs of the register stages of the first storage register; a timing means for switching the bit counter forward coincident with the timing of the telegraph bits, said bit counter having outputs connected with said control inputs of the registered stages of the first storage register so that said stages are activated one after the other for the recording of the telegraph bits, and further comprising: a second storage register including signal inputs, control inputs and outputs and said signal inputs being connected in parallel with the outputs of the first storage register, said second register outputs being connected in parallel with the signal inputs of said comparing register, and said control inputs of the register stages of said second storage register being connected in parallel with an output of said bit counter, which has means to emit an activating signal at the end of the transmission of one telegraph bit group.

3. Electronic converter and control apparatus as defined in claim 2 further comprising: means providing a reset signal responsive to the content of the comparing register having been evaluated, and to filling of the second storage register; and a transmission control circuit, connected to trigger transmission of the contents of said second storage register into said comparing register.

4. Electronic converter and control apparatus as defined in claim 1, wherein said page printing receiver includes printing hammer means, the type on said type carrier are disposed in a sequence corresponding to the sequence of the natural binary numbers of the matching telegraph bit groups, said position indicator produces a position pulse for each type, said position register is a multi-stage binary counter to which the position pulses are fed as counting pulses, and additional means provided in said position indicator produce an erasing pulse for the binary counter following each rotation of said type carrier at such a time point in the rotation of said type carrier that the type corresponding in each case to the content of said binary counter is located a predetermined number of type positions from the location of said printing hammer means; and further comprising: an auxiliary counter to which the position pulses are fed as counting pulses started by the triggering signal given off from the comparing circuit and said auxiliary counter having means to emit a triggering pulse for said printing hammer means after counting a number of position impulses corresponding to said predetermined number of type positions; and a type ribbon lifting mechanism actuated immediately by the triggering signal given off from said comparing circuit.

5. Electronic converter and control apparatus as defined in claim 4, wherein a space forward initiating means is triggered by the triggering pulse given off by said auxiliary counter.

6. Electronic converter and control apparatus as defined in claim 4, further comprising a gating circuit connected to an output of said auxiliary counter enabling a reset signal to be sent to the transmission control circuit at the end of the auxiliary counter counting cycle.

7. Electronic converter and control apparatus as defined in claim 3, further including: function detector circuits connected to the outputs of said comparing register, said function detector circuits being matched to the different machine functions which require no actuation of the printing hammer mechanism, and each of said function detector circuits including means providing an output signal when a telegraph bit group corresponding to the matching machine function appears; and matching gate circuits, with inputs connected to associated function detector circuits and to said comparing circuit whereby a coincidence trigger signal is fed to a triggering system for the appropriate machine function, as determined by an output signal from the associated function detector circuit.

8. Electronic converter and control apparatus as defined in claim 7, wherein an inhibiting circuit in the connection between said comparing circuit and said auxiliary counter is connected to receive the output signal from each function detector circuit to block the triggering signal to said auxiliary counter and said type ribbon lifting mechanism given off by the comparing circuit.

9. Electronic converter and control apparatus as defined in claim 7, including: a by-pass reset gate circuit is provided between said comparing circuit and said transmission control circuit and is connected to receive the output signal of each function detector circuit and is also connected to the trigger output of said comparing circuit and is adapted to feed the triggering signal given off by the comparing circuit to the transmission control circuit as a reset signal upon receipt of any output signal from a function detector circuit.

10. Electronic converter and control apparatus as defined in claim 9, provided with a delay circuit connected between said by-pass reset gate circuit and said transmission control circuit.

11. Electronic converter and control apparatus as defined in claim 10, wherein means connect the triggering system for carriage return with the triggering system for said space forward circuit and enable the latter to be maintained energized during the period of carriage return.

12. Electronic converter and control apparatus in a page printing telegraph receiver comprising: a continually rotating type drum with a plurality of equal, parallel type rows; printing means with two printing hammers disposed side by side with a separation equal to the separation between type rows; print hammer control means including electromagnetic devices enabling said hammers to be separately actuatable; a position indicator for producing position signals that characterize the rotational position of the type within rows on the type drum; a comparing apparatus which compares the position signals with the transmitted telegraph bit groups and releases the required functions in the printing mechanism on determination of coincidence, comprising a series-parallel converter to convert each incoming telegraph bit group into parallel form, a comparing register in which the telegraph bit group converted into parallel form is stored, a position register in which the position signals are recorded one after the other in parallel form, and a comparing circuit means including two comparing circuits connected to the outputs of said position register and with said comparing register so that they compare the contents of the position register with two telegraph bit groups received one after the other, and means connected between said comparing circuits and said electromagnetic actuating devices enabling triggering signals to be emitted by the two comparing circuits on determination of a coincidence and to be fed to the electromagnetic actuating devices of one or else the other printing hammer; and a space forward switching mechanism having control circuits responsive to said comparing circuit triggering signals and including means which effects, when triggered, a forward spacing of said printing means amounting to two type rows on said drum.

13. Electronic converter and control apparatus as defined in claim 12, wherein a first of said comparing circuits is connected with the outputs of said comparing register and the second of said comparing circuits is connected with the input leads of said comparing register.

14. Electronic converter and control apparatus as defined in claim 12, further including a steering control register connected to said print hammer control means and including input circuits enabling said steering control means to be placed in its first condition after each spacing forward signal and in its second condition responsive to the feeding of a telegraph bit group and which permits the transmission of the fed telegraph bit group into said comparing register and also permits the feeding of another telegraph bit group only when in its first condition.

15. Electronic converter and control apparatus as defined in claim 14, wherein input means enable said steering control register to be invariably placed in its first condition following a carriage return.

16. Electronic converter and control apparatus as defined in claim 14, wherein the machine receiving circuit includes an occupied register, which is placed in its working condition with the feeding of each telegraph bit group, in which condition it blocks the feeding of other telegraph bit groups, and circuit means are provided connecting between said steering control register and said occupied register enabling said occupied register to be placed back into its reset condition with every change of condition in said steering control register.

17. Electronic converter and control apparatus as defined in claim 16, wherein said occupied register includes circuit means which emits a triggering pulse when said occupied register passes from the reset condition into the working condition, and additional gating means with control connections from said occupied register and said steering control register, and an output connected to the transmission control circuits of said comparing register enabling said triggering pulse to be fed to the transmission control circuits of said comparing register if said control register is in its first condition.

18. Electronic converter and control apparatus as defined in claim 14, wherein a switching system is connected to said control means for said printing means and has an output connection to said space forward printing mechanism which effects the automatic triggering of said space forward switching mechanism when said two electromagnetic actuating devices of said printing hammers have been actuated one after the other.

19. Electronic converter and control apparatus as defined in claim 18, wherein dual print signal detectors, one for each hammer, are provided and connected to the electromagnetic actuating device of the associated printing hammer, said print signal detectors being placed in the reset condition with the feeding of a telegraph bit group during the first or else the second condition of the control register, in which reset condition said detectors open gate circuits for the transmission of the triggering pulse given off by the matching comparing circuit and which is placed in the working condition with the transmission of this triggering pulse, in which working condition it blocks the transmission of other triggering pulses; in that each print signal detector emits a pulse when going from the reset condition into the working condition, which pulse is fed to the space forward switching mechanism; and in that a space forward switching control register is provided which is brought into the reset condition after each spacing forward, whose control input is fed pulses given off by the print signal detectors, and which prevents the release of the space forward mechanism by said print signal detector pulses when said space forward switching mechanism is in the reset condition.

20. Electronic converter and control apparatus as defined in claim 19, wherein circuit means responsive to a carriage return actuation and connected to said space forward switching control register are provided to place said space forward switching control register into the reset condition during the carriage return function.

21. Electronic converter and control apparatus as defined in claim 19, wherein a space forward switching detector circuit is provided and which emits a signal with the feeding of a space forward switching telegraph bit group, said signal bringing the control register into its second condition and the space forward switching control register into its working condition and which has inputs fed by way of a gate circuit, connected to and opened by the control register in its second condition, to the triggering input of said space forward switching mechanism.

22. Electronic converter and control apparatus as defined in claim 19, wherein a plurality of function detector circuits are provided, each of which give off a signal in accord with the feeling of telegraph bit groups representing associated functions requiring no printing hammer actuation, said signals preventing the transmission of the telegraph bit group into the comparing register, preventing the moving of the control register into the second condition, and preventing the resetting of the print signal detectors into the reset condition, triggering the functions to be performed and effecting the resetting of the occupied register into the reset condition, if need be, immediately following the ending of the function.

23. An electronic transitorized drum printer receiver including a print drum, at least one print hammer, a shifting print hammer carriage, automatic print hammer carriage spacing mechanism and carriage return mechanism comprising electronic control circuitry capable of receiving multiple serial information bits on an incoming line; means including a first register to be connected to said incoming line to convert and register received serial code signal units in parallel bit form; means to determine whether such parallel registered code unit bits call for printing of a character or for a machine function and determining, if a machine function is called for, what that machine function is; a second register to receive said multiple bit parallel information from said first register to make room for receiving the next following character on the incoming line while the first character is being printed or while the represented function is being performed; a third register and means to shift the multiple code unit bits from said second register into the third register to provide storage for two additional characters during an automatic carriage return operation; and means providing comparative coincidence control responsive to the code unit bit in said third register and to position pulses derived from print drum rotation to determine when the character on the drum corresponding to the registered code signal is about to pass the print hammer, thereafter control printing action of the print hammer, clear said third register, control subsequent operation of carriage spacing after the character is printed and to enable automatic control for operation of carriage return and complete disabling of carriage spacing mechanism during carriage return.

References Cited

UNITED STATES PATENTS

| | | | |
|---|---|---|---|
| 3,066,601 | 12/1962 | Eden | 101—93 |
| 3,140,470 | 7/1964 | Deerfield | 340—172.5 |
| 3,167,002 | 1/1965 | Kanede et al. | 101—93 |
| 3,222,651 | 12/1965 | Fabiszewski et al. | 340—172.5 |
| 3,219,976 | 11/1965 | Tucker | 340—172.5 |

ROBERT C. BAILEY, *Primary Examiner.*

R. M. RICKERT, *Assistant Examiner.*

UNITED STATES PATENT OFFICE
CERTIFICATE OF CORRECTION

Patent No. 3,363,238 January 9, 1968

Clayton H. Clark et al.

It is hereby certified that error appears in the above numbered patent requiring correction and that the said Letters Patent should read as corrected below.

Column 1, line 49, for "sode" read -- code --; column 3, line 75, for "logic," read -- logic. --; column 5, line 17, for "pulse" read -- pulses --; column 6, line 11, for "aspect" read -- aspects --; line 73, for "reels" read -- reeds --; column 8, line 17, for "u.p.m." read -- w.p.m. --; column 11, line 29, for "gate" read -- gates --; column 16, line 48, for "conected" read -- connected --; column 17, line 56, after "hereinafter" insert a period; same line 56, for "simultaneously" read -- Simultaneously --, as the beginning of a new paragraph; column 19, line 11, after "applied" insert a comma; line 75, after "2" insert a closing parenthesis; column 20, line 28, for "The" read -- Two --; column 27, line 27, for "feeling" read -- feeding --.

Signed and sealed this 18th day of February 1969.

(SEAL)
Attest:

EDWARD M.FLETCHER,JR.
Attesting Officer

EDWARD J. BRENNER
Commissioner of Patents